US008813257B2

(12) United States Patent
Shibata et al.

(10) Patent No.: US 8,813,257 B2
(45) Date of Patent: Aug. 19, 2014

(54) DOWNLOAD TERMINAL, AND CONTENT UTILIZATION SYSTEM

(71) Applicant: Panasonic Corporation, Osaka (JP)

(72) Inventors: Ken-ichi Shibata, Osaka (JP); Takuya Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 13/660,381

(22) Filed: Oct. 25, 2012

(65) Prior Publication Data

US 2013/0055414 A1 Feb. 28, 2013

Related U.S. Application Data

(63) Continuation of application No. PCT/JP2011/000872, filed on Feb. 17, 2011.

(30) Foreign Application Priority Data

Apr. 28, 2010 (JP) ................................ 2010-103303

(51) Int. Cl.
*G06F 7/04* (2006.01)

(52) U.S. Cl.
USPC ............................... 726/30; 726/26; 709/219

(58) Field of Classification Search
CPC ....... G06F 21/10; G06F 21/12; G06F 21/105; G06F 21/60; G06F 21/725
USPC ...................................... 726/30, 26; 709/219
See application file for complete search history.

(56) References Cited

U.S. PATENT DOCUMENTS

| 6,034,832 A | 3/2000 | Ichimura et al. |
| 2005/0149340 A1 | 7/2005 | Murakami et al. |
| 2005/0278259 A1* | 12/2005 | Gunaseelan et al. ............ 705/59 |

(Continued)

FOREIGN PATENT DOCUMENTS

| JP | 10-3745 | 1/1998 |
| JP | 2002-73402 | 3/2002 |

(Continued)

OTHER PUBLICATIONS

Oikonomidis, N. ; Ruland, C. "Identity based protocols for secure electronic content distribution and licensing"; Web Delivering of Music, 2004. WEDELMUSIC 2004. Proceedings of the Fourth International Conference on Digital Object Identifier: 10.1109/WDM.2004.1358105 ;Publication Year: 2004 , pp. 92-99.*

(Continued)

*Primary Examiner* — Hadi Armouche
*Assistant Examiner* — Angela Holmes
(74) *Attorney, Agent, or Firm* — Wenderoth, Lind & Ponack, L.L.P.

(57) ABSTRACT

A download terminal acquires and stores a content from a content server, acquires from a license server, a writing-out license including a use condition for writing out of the content to an exchangeable medium and writes out the content to the exchangeable medium according to the writing-out license. The writing-out license includes a pack identifier given to a content group to which the content belongs, and viewing term information of the content, as the use condition. The download terminal determines based on the viewing term information, a viewing time limit of the content to be written out, and synchronizes a viewing time limit of other content having a same pack identifier as that of the content.

18 Claims, 28 Drawing Sheets

(56) References Cited

U.S. PATENT DOCUMENTS

| | | |
|---|---|---|
| 2006/0005257 A1 | 1/2006 | Tohru et al. |
| 2006/0053081 A1 | 3/2006 | Ito |
| 2006/0224521 A1* | 10/2006 | Lakamp et al. ............... 705/59 |
| 2007/0079342 A1 | 4/2007 | Ellis et al. |
| 2008/0008456 A1 | 1/2008 | Buttars et al. |
| 2008/0091900 A1 | 4/2008 | Imai et al. |
| 2009/0030841 A1 | 1/2009 | Sato et al. |
| 2010/0046918 A1 | 2/2010 | Takao et al. |

FOREIGN PATENT DOCUMENTS

| | | |
|---|---|---|
| JP | 2004-227282 | 8/2004 |
| JP | 2008-504640 | 2/2008 |
| JP | 2008-250875 | 10/2008 |
| WO | WO 2008146913 A1 * | 12/2008 |
| WO | 2010/021147 | 2/2010 |

OTHER PUBLICATIONS

Hwang, Seong; "Content and Service Protection for IPTV"; Broadcasting, IEEE Transactions on vol. 55, Issue: 2, Part: 2 Digital Object Identifier: 10.1109/TBC.2009.2020446; Publication Year: 2009, pp. 425-436.*

International Search Report issued Mar. 22, 2011 in International Application No. PCT/JP2011/000872.

* cited by examiner

| LICENSE TYPE | 0x15 |
|---|---|
| CONTENT ID | 0x121123 |
| DECRYPTION KEY | 0xABCA3AF |

713 — LICENSE TYPE
705 — CONTENT ID
702 — DECRYPTION KEY

| LICENSE TYPE | 0x12 |
|---|---|
| CONTENT ID | 0x121123 |
| PACK ID | (N.A.) |
| VIEWING TERM | (N.A.) |
| VIEWING TIME LIMIT START | 2010/1/31/12:00 |
| VIEWING TIME LIMIT END | 2010/2/1/12:00 |
| MEDIA TYPE | SD CARD |

713 — LICENSE TYPE
705 — CONTENT ID
714 — PACK ID
703 — VIEWING TERM
704 — VIEWING TIME LIMIT START / VIEWING TIME LIMIT END
711 — MEDIA TYPE

| LICENSE TYPE | 0x13 |
|---|---|
| CONTENT ID | 0x8A3BC1 |
| PACK ID | 0xABA8 |
| VIEWING TERM | 48 HOURS |
| VIEWING TIME LIMIT START | (N.A.) |
| VIEWING TIME LIMIT END | (N.A.) |
| MEDIA TYPE | SD CARD |

713 — LICENSE TYPE
705 — CONTENT ID
714 — PACK ID
703 — VIEWING TERM
704 — VIEWING TIME LIMIT START / VIEWING TIME LIMIT END
711 — MEDIA TYPE

| # | CONTENT ID 705 | PACK ID 714 | VIEWING TERM 703 | VIEWING TIME LIMIT START 704 | VIEWING TIME LIMIT END |
|---|---|---|---|---|---|
| 1 | 0x121123 | (N.A.) | (N.A.) | 2010/1/31/12:00 | 2010/2/1/12:00 |
| 2 | 0x8A3BC1 | 0xABA8 | 48 HOURS | (N.A.) | (N.A.) |
| : | : | : | : | : | : |

| # | CONTENT ID 705 | PACK ID 714 | VIEWING TERM 703 | VIEWING TIME LIMIT START 704 | VIEWING TIME LIMIT END |
|---|---|---|---|---|---|
| 1 | 0x121123 | (N.A.) | (N.A.) | 2010/1/31/12:00 | 2010/2/1/12:00 |
| 2 | 0x8A3BC1 | 0xABA8 | 48 HOURS | 2010/2/4/10:00 | 2010/2/6/10:00 |
| : | : | : | : | : | : |

| # | CONTENT ID | PACK ID | VIEWING TERM | VIEWING TIME LIMIT START | VIEWING TIME LIMIT END |
|---|---|---|---|---|---|
| 1 | 0x121123 | (N.A.) | (N.A.) | 2010/1/31/12:00 | 2010/2/1/12:00 |
| 2 | 0x8A3BC1 | 0xABA8 | 48 HOURS | 2010/2/4/10:00 | 2010/2/6/10:00 |
| 3 | 0xAAF1AB | 0x123A | (N.A.) | 2010/2/3/12:00 | 2010/2/5/12:00 |
| 4 | 0X1893AB | 0xABA8 | 48 HOURS | (N.A.) | (N.A.) |
| .. | .. | .. | .. | .. | .. |

| # | CONTENT ID | PACK ID | VIEWING TERM | VIEWING TIME LIMIT START | VIEWING TIME LIMIT END |
|---|---|---|---|---|---|
| 1 | 0x121123 | (N.A.) | (N.A.) | 2010/1/31/12:00 | 2010/2/1/12:00 |
| 2 | 0x8A3BC1 | 0xABA8 | 48 HOURS | 2010/2/4/10:00 | 2010/2/6/10:00 |
| 3 | 0xAAF1AB | 0x123A | (N.A.) | 2010/2/3/12:00 | 2010/2/5/12:00 |
| 4 | 0X1893AB | 0xABA8 | 48 HOURS | 2010/2/4/10:00 | 2010/2/6/10:00 |
| .. | .. | .. | .. | .. | .. |

| # | CONTENT ID | VIEWING TIME LIMIT START | VIEWING TIME LIMIT END |
|---|---|---|---|
| 1 | 0x121123 | 2010/1/31/12:00 | 2010/2/1/12:00 |
| 2 | 0x8A3BC1 | 2010/2/4/10:00 | 2010/2/6/10:00 |
| 3 | 0xAAF1AB | 2010/2/3/12:00 | 2010/2/5/12:00 |
| 4 | 0X1893AB | 2010/2/4/10:00 | 2010/2/6/10:00 |
| ·· | ·· | ·· | ·· |

705 ↗     704

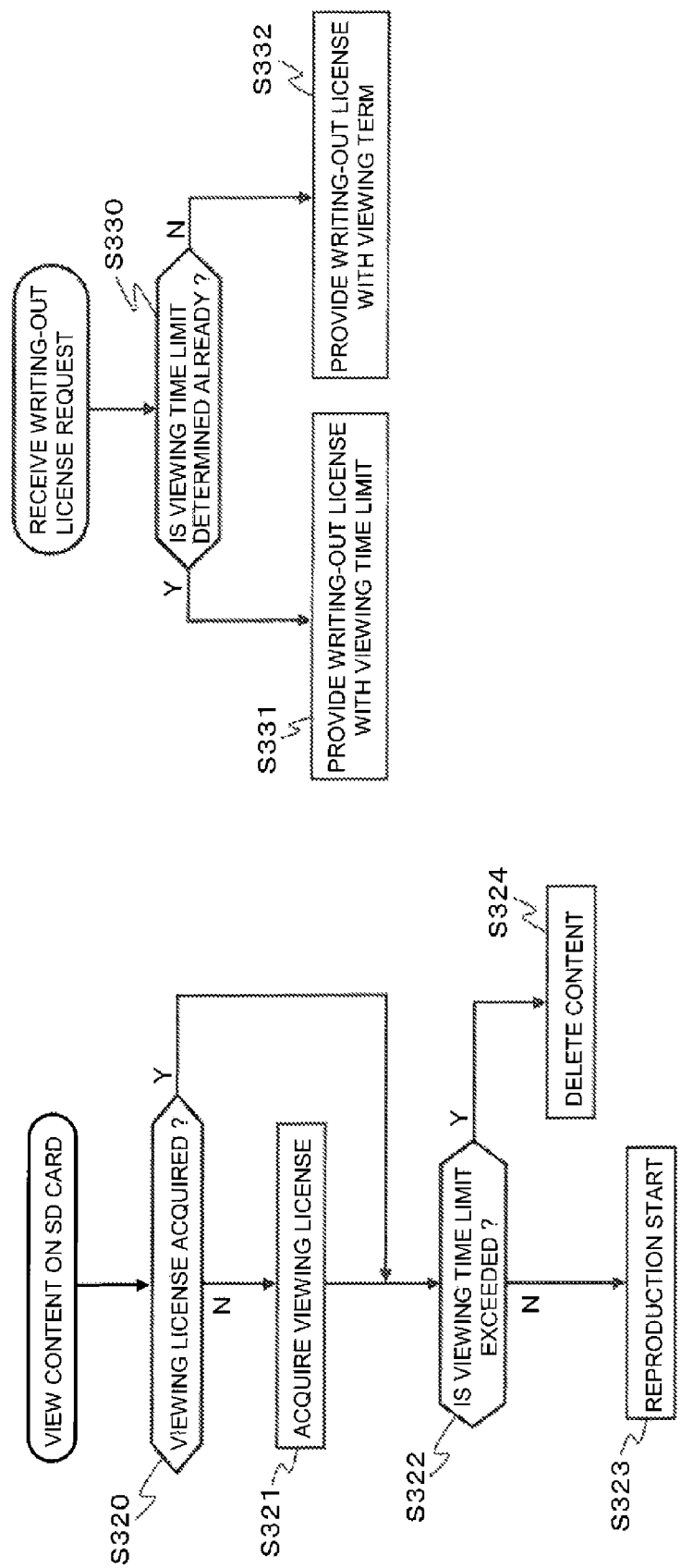

FIG. 9(A) 824

| | | |
|---|---|---|
| 713 | LICENSE TYPE | 0x10 |
| 705 | CONTENT ID | 0x121123 |
| 714 | PACK ID | (N.A.) |
| 702 | DECRYPTION KEY | 0xABCA3AF |
| 703 | VIEWING TERM | (N.A.) |
| 704 | VIEWING TIME LIMIT START | 2010/1/31/12:00 |
| | VIEWING TIME LIMIT END | 2010/2/1/12:00 |

FIG. 9(B) 825

| | | |
|---|---|---|
| 713 | LICENSE TYPE | 0x11 |
| 705 | CONTENT ID | 0x8A3BC1 |
| 714 | PACK ID | 0xABA8 |
| 702 | DECRYPTION KEY | 0xF83AD4E |
| 703 | VIEWING TERM | 48 HOURS |
| 704 | VIEWING TIME LIMIT START | (N.A.) |
| | VIEWING TIME LIMIT END | (N.A.) |

FIG. 9(C) 826

| | | |
|---|---|---|
| 713 | LICENSE TYPE | 0x12 |
| 705 | CONTENT ID | 0x121123 |
| 714 | PACK ID | (N.A.) |
| 702 | DECRYPTION KEY | 0xABCA3AF |
| 703 | VIEWING TERM | (N.A.) |
| 704 | VIEWING TIME LIMIT START | 2010/1/31/12:00 |
| | VIEWING TIME LIMIT END | 2010/2/1/12:00 |
| 711 | MEDIA TYPE | SD CARD |

FIG. 9(D) 827

| | | |
|---|---|---|
| 713 | LICENSE TYPE | 0x13 |
| 705 | CONTENT ID | 0x8A3BC1 |
| 714 | PACK ID | 0xABA8 |
| 702 | DECRYPTION KEY | 0xF83AD4E |
| 703 | VIEWING TERM | 48 HOURS |
| 704 | VIEWING TIME LIMIT START | (N.A.) |
| | VIEWING TIME LIMIT END | (N.A.) |
| 711 | MEDIA TYPE | SD CARD |

| # | CONTENT ID | PACK ID | DECRYPTION KEY | VIEWING TERM | VIEWING TIME LIMIT START | VIEWING TIME LIMIT END |
|---|---|---|---|---|---|---|
| 1 | 0x121123 | (N.A.) | ABCA3AF | (N.A.) | 2010/1/31/12:00 | 2010/2/1/12:00 |
| 2 | 0x8A3BC1 | 0xABA8 | F83AD4E | 48 HOURS | (N.A.) | (N.A.) |
| 3 | 0xAAF1AB | 0x123A | 4E89AC | (N.A.) | 2010/2/3/12:00 | 2010/2/5/12:00 |
| 4 | 0X1893AB | 0xABA8 | 29A8CBF | 48 HOURS | (N.A.) | (N.A.) |
| : | : | : | : | : | : | : |

| # | CONTENT ID | PACK ID | DECRYPTION KEY | VIEWING TERM | VIEWING TIME LIMIT START | VIEWING TIME LIMIT END |
|---|---|---|---|---|---|---|
| 1 | 0x121123 | (N.A.) | ABCA3AF | (N.A.) | 2010/1/31/12:00 | 2010/2/1/12:00 |
| 2 | 0x8A3BC1 | 0xABA8 | F83AD4E | 48 HOURS | 2010/2/4/10:00 | 2010/2/6/10:00 |
| 3 | 0xAAF1AB | 0x123A | 4E89AC | (N.A.) | 2010/2/3/12:00 | 2010/2/5/12:00 |
| 4 | 0X1893AB | 0xABA8 | 29A8CBF | 48 HOURS | 2010/2/4/10:00 | 2010/2/6/10:00 |
| : | : | : | : | : | : | : |

| # | CONTENT ID | DECRYPTION KEY | VIEWING TIME LIMIT START | VIEWING TIME LIMIT END |
|---|---|---|---|---|
| 1 | 0x121123 | ABCA3AF | 2010/1/31/12:00 | 2010/2/1/12:00 |
| 2 | 0x8A3BC1 | F83AD4E | 2010/2/4/10:00 | 2010/2/6/10:00 |
| 3 | 0xAAF1AB | 4E89AC | 2010/2/3/12:00 | 2010/2/5/12:00 |
| 4 | 0X1893AB | 29A8CBF | 2010/2/4/10:00 | 2010/2/6/10:00 |
| .. | .. | .. | .. | .. |

| | | |
|---|---|---|
| 713 | LICENSE TYPE | 0x10 |
| 705 | CONTENT ID | 0x121123 |
| 702 | DECRYPTION KEY | 0xABCA3AF |
| 703 | VIEWING TERM | (N.A.) |
| 704 | VIEWING TIME LIMIT START | 2010/1/31/12:00 |
| | VIEWING TIME LIMIT END | 2010/2/1/12:00 |

| | | |
|---|---|---|
| 713 | LICENSE TYPE | 0x11 |
| 705 | CONTENT ID | 0x8A3BC1 |
| 702 | DECRYPTION KEY | 0xF83AD4E |
| 703 | VIEWING TERM | 48 HOURS |
| 704 | VIEWING TIME LIMIT START | (N.A.) |
| | VIEWING TIME LIMIT END | (N.A.) |

| | | |
|---|---|---|
| 713 | LICENSE TYPE | 0x12 |
| 705 | CONTENT ID | 0x121123 |
| 702 | DECRYPTION KEY | 0xABCA3AF |
| 703 | VIEWING TERM | (N.A.) |
| 704 | VIEWING TIME LIMIT START | 2010/1/31/12:00 |
| | VIEWING TIME LIMIT END | 2010/2/1/12:00 |
| 711 | MEDIA TYPE | SD CARD |

| | | |
|---|---|---|
| 713 | LICENSE TYPE | 0x13 |
| 705 | CONTENT ID | 0x8A3BC1 |
| 702 | DECRYPTION KEY | 0xF83AD4E |
| 703 | VIEWING TERM | 48 HOURS |
| 704 | VIEWING TIME LIMIT START | (N.A.) |
| | VIEWING TIME LIMIT END | (N.A.) |
| 711 | MEDIA TYPE | SD CARD |

| # | CONTENT ID | DECRYPTION KEY | VIEWING TERM | VIEWING TIME LIMIT START | VIEWING TIME LIMIT END |
|---|---|---|---|---|---|
| 1 | 0x121123 | ABCA3AF | (N.A.) | 2010/1/31/12:00 | 2010/2/1/12:00 |
| 2 | 0x8A3BC1 | F83AD4E | 48 HOURS | 2010/2/4/10:00 | 2010/2/6/10:00 |
| 3 | 0xAAF1AB | 4E89AC | (N.A.) | 2010/2/3/12:00 | 2010/2/5/12:00 |
| 4 | 0X1893AB | 29A8CBF | 48 HOURS | 2010/2/4/10:00 | 2010/2/6/10:00 |
| .. | .. | .. | .. | .. | .. |

| # | CONTENT ID | DECRYPTION KEY | VIEWING TIME LIMIT START | VIEWING TIME LIMIT END |
|---|---|---|---|---|
| 1 | 0x121123 | ABCA3AF | 2010/1/31/12:00 | 2010/2/1/12:00 |
| 2 | 0x8A3BC1 | F83AD4E | 2010/2/4/10:00 | 2010/2/6/10:00 |
| ⋮ | ⋮ | ⋮ | ⋮ | ⋮ |

705 — 702 — 704

DOWNLOAD TERMINAL, AND CONTENT UTILIZATION SYSTEM

CROSS-REFERENCE TO RELATED APPLICATIONS

This application is a continuation application of PCT International Patent Application No. PCT/JP2011/000872 filed Feb. 17, 2011, claiming the benefit of priority of Japanese Patent Application No. 2010-103303 filed Apr. 28, 2010, all of which are incorporated by reference herein in their entirety.

BACKGROUND OF THE INVENTION

1. Field of the Invention

The present invention relates to a download terminal and a content utilization system for copying and bringing out an encrypted content with managed viewing time limit from a download terminal to an exchangeable medium to reproduce the encrypted content by a reproducer.

2. Related Art of the Invention

In recent years, owing to the development of the Internet, techniques for downloading and reproducing movies, music, and the like are generally used. A large number of services are provided for downloading, through networks, contents from servers, which perform content delivery of movies, music, and the like, to PCs, AV apparatuses, cellular phones, and portable apparatuses.

In such content delivery services, there are content sales of a sell-off type with which a user can permanently view purchased content and rental sales with which a user can view downloaded content until a limited viewing time limit.

In typical content sales of a download type, a content provider that supplies content operates a content server and a DRM server. A content receiver on a viewer side downloads an encrypted rental content from the content server and acquires, from the DRM server, a decryption key of the encrypted content and viewing conditions for the content. The viewing conditions for the content include information concerning a viewing time limit within which a user is permitted to view the content and a copy condition for the content.

When the content receiver reproduces the rental content, the content receiver refers to a viewing time limit designated from the DRM server. If the viewing time limit is not exceeded, the content receiver starts the reproduction of the content. If the viewing time limit is exceeded, the content receiver carries out deletion of the content. In some cases, the content receiver writes out a rental content to an exchangeable medium such as an SD card together with the viewing time limit. In this case, when a reproduction terminal for the SD card starts to reproduce a rental content or has ended the reproduction of the content, the reproduction terminal checks the viewing time limit for the content, and deletes the content if the viewing time limit is exceeded. As a method of reproducing content with viewing time limit of this type, for example, there is a method described in Patent Document 1 (Japanese Patent Application Laid-Open No. 2004-227282).

FIG. 28 is a sequence diagram for a terminal that downloads a content from a server and moves the content so that the content is viewed in another terminal in conventional content downloading as described in Patent Document 1.

A download terminal 601 can view a content by storing the content distributed from a server 600 and acquiring a viewing license of the content from the server 600.

To allow the content to be viewed in another viewing terminal 602, the content can be moved from the download terminal 601 to the viewing terminal 602. However, the server 600 manages the viewing license in association with the download terminal 601. Therefore, the viewing terminal 602, which is another terminal, acquires a viewing license by itself from the server 600 to view the content.

Regarding the forms of the viewing license to be provided, there are (i) a viewing license with viewing time limit for providing a reproduction permission condition of the target content by designating absolute date and time, and (ii) a viewing license with viewing term such that absolute date and time is not designated when the license is provided and only a viewable period, such as 48 hours, is designated for determining the viewing time limit upon the first viewing on the terminal.

If the content is provided with the viewing license with viewing term, the terminal that reproduces the content does not acquire the viewing license from the server 600 again. The terminal itself determines and sets, for example, the date and time after 48 hours from the start of the initial reproduction of the content as the viewing time limit of the content.

Also, regarding the forms of selling a rental content, there is what is called pack selling. The pack selling provides, for example, all twelve episodes of a TV drama as one content group, or as a package, where the twelve episodes are provided at a lower price than the episodes to be individually purchased. In this case, the price for the service paid by the user to the service provider is lower. But the viewing time limits of all the pack contents are usually unified. Specifically, the viewing time limits of all twelve contents are set to the same date and time when viewing of any one of the contents is started after the download of the twelve contents.

However, in the above conventional technique, there is a problem that the viewing time limits of the pack contents cannot be unified when the rental content is written out, without a determined viewing time limit (rental content provided with viewing license with viewing term), to an exchangeable medium such as an SD card to be viewed by the portable terminal and the like.

This problem will be described below.

For example, when a download terminal writes out some of the rental contents sold in pack to an exchangeable medium such as an SD card to view the content in a portable terminal or the like, the viewing time limits need to be synchronous with the contents left (not written out) in the download terminal.

If one of the rental contents sold in pack is already viewed on the download terminal, the viewing time limit of the pack is determined. Therefore, a synchronization state can be secured if the viewing time limit is inherited when a content is written out to an exchangeable medium. On the other hand, if some of the rental contents in the pack are written out to the exchangeable medium when none of the rental contents in the pack are viewed, the rental contents that need to share the viewing time limit are to be saved in storage media physically separated from each other. Therefore, the viewing time limits are to be separately set at initial view, and the viewing time limits cannot be synchronized.

FIG. 29 is a sequence diagram, in which the download terminal 601 that has received pack rental contents from the server 600 writes out some of the contents of the pack to an SD card 606, and the viewing terminal 602 starts to view the content on the SD card 606.

An HDD 605 of the server 600 stores twelve contents with content numbers C1 to C12 in a pack. A case will be considered in which the download terminal 601 downloads nine contents with content numbers C1 to C9 of the twelve contents and writes out (moves) five contents with content numbers C1 to C5 to the SD card 606.

If none of the contents with content numbers C1 to C9 have been viewed in the download terminal 601 before the contents are written out to the SD card 606, the viewing time limits of all contents with content numbers C1 to C12 are not determined yet and, for example, a viewing term is only designated e.g., the contents can be viewed during 48 hours from the first viewing.

When any of the contents with content numbers C6 to C9, which are left in the download terminal 601, is viewed at the download terminal 601, the viewing time limits of all contents with content numbers C1 to C12 need to be determined so as to be synchronous with the content. However, the contents with content numbers C1 to C5 brought out by the SD card 606 are under the management of the viewing terminal 602, and the download terminal 601 has no means to determine the viewing time limits of the contents with content numbers C1 to C5. The download terminal 601 also has no means to determine the viewing time limits of the contents with content numbers C10 to C12 that are not yet downloaded to the download terminal 601. There are such problems in the conventional technique.

The problem occurs not only for pack contents but also for a content when the content is copied and written out to an exchangeable medium, such as the SD card 606, while the original content is left in the download terminal 601. More specifically, if a copy of a content without a determined viewing time limit is written out to the SD card 606, the viewing time limit of the content left in the download terminal 601 is determined when the content is reproduced by the download terminal 601, but the viewing time limit of the content written out to the SD card 606 is determined when the content is reproduced by the viewing terminal 602. Therefore, different viewing time limits are set for one content.

In consideration of the above-described conventional problems, an object of the present invention is to provide a download terminal and a content utilization system capable of synchronizing viewing time limits of a plurality of contents that need to have the same viewing time limits even if some of the contents, the viewing time limits of which are not determined yet, among the plurality of contents are written out to an exchangeable medium before the viewing time limits are determined.

SUMMARY OF THE INVENTION

The $1^{st}$ aspect of the present invention is a download terminal which (i) acquires and stores a content from a content server, (ii) acquires, from a writing-out license server, a writing-out license including a use condition for writing out of the content to an exchangeable medium, and (iii) writes out the content to the exchangeable medium according to the writing-out license, the download terminal comprising:
 a time limit determination unit; and
 a pack time limit determination unit, wherein
 the writing-out license includes a pack identifier given to a content group to which the content belongs, and viewing term information of the content, as the use condition;
 the time limit determination unit determines, based on the viewing term information, a viewing time limit of the content the viewing time limit of which has not been determined; and
 the pack time limit determination unit sets the determined viewing time limit of the content to a viewing time limit of other content having a same pack identifier as that of the content, among the stored contents.

The $2^{nd}$ aspect of the present invention is a download terminal which (i) acquires and stores a content from a content server, (ii) acquires, from a writing-out license server, a writing-out license including a use condition for writing out of the content to an exchangeable medium, (iii) acquires, from a viewing license server, a viewing license including a use condition for reproducing of the content, and (iv) writes out the content to the exchangeable medium according to the writing-out license, the download terminal comprising:
 a time limit determination unit; and
 a pack time limit determination unit, wherein
 at least one of the writing-out license and the viewing license includes a pack identifier given to a content group to which the content belongs, and viewing term information of the content, as the use condition;
 the time limit determination unit determines, based on the viewing term information, a viewing time limit of the content the viewing time limit of which has not been determined; and
 the pack time limit determination unit sets the determined viewing time limit of the content to a viewing time limit of other content having a same pack identifier as that of the content, among the stored contents.

The $3^{rd}$ aspect of the present invention is the download terminal according to the $1^{st}$ aspect of the present invention, wherein
 when the content is written out to the exchangeable medium, the time limit determination unit determines the viewing time limit of the content.

The $4^{th}$ aspect of the present invention is the download terminal according to the $2^{nd}$ aspect of the present invention, wherein
 when the content is written out to the exchangeable medium, the time limit determination unit determines the viewing time limit of the content.

The $5^{th}$ aspect of the present invention is the download terminal according to the $1^{st}$ aspect of the present invention, wherein
 when the writing-out license is acquired from the writing-out license server, if a viewing time limit of a content having a same pack identifier as the pack identifier included in the writing-out license, has been determined, the time limit determination unit sets the determined viewing time limit to a viewing time limit of a content corresponding to the writing-out license.

The $6^{th}$ aspect of the present invention is the download terminal according to the $2^{nd}$ aspect of the present invention, wherein
 when the writing-out license is acquired from the writing-out license server, if a viewing time limit of a content having a same pack identifier as the pack identifier included in the writing-out license, has been determined, the time limit determination unit sets the determined viewing time limit to a viewing time limit of a content corresponding to the writing-out license.

The $7^{th}$ aspect of the present invention is a download terminal which (i) acquires and stores a content from a content server, (ii) acquires, from a viewing license server, a viewing license including a use condition for reproducing of the content, and (iii) writes out the content to an exchangeable medium, the download terminal comprising:
 a time limit determination unit; and
 a pack time limit determination unit, wherein
 the viewing license includes a pack identifier given to a content group to which the content belongs, and viewing term information of the content, as the use condition;

the time limit determination unit determines, based on the viewing term information, a viewing time limit of the content the viewing time limit of which has not been determined; and the pack time limit determination unit sets the determined viewing time limit of the content to a viewing time limit of other content having a same pack identifier as that of the content, among the stored contents.

The 8th aspect of the present invention is the download terminal according to the 7th aspect of the present invention, wherein when the content is written out to the exchangeable medium, the time limit determination unit determines the viewing time limit of the content.

The 9th aspect of the present invention is the download terminal according to the 1st aspect of the present invention, further comprising a content writing-out unit which writes out the content and information of the determined viewing time limit, to the exchangeable medium.

The 10th aspect of the present invention is the download terminal according to the 2nd aspect of the present invention, further comprising a content writing-out unit which writes out the content and information of the determined viewing time limit, to the exchangeable medium.

The 11th aspect of the present invention is the download terminal according to the 7th aspect of the present invention, further comprising a content writing-out unit which writes out the content and information of the determined viewing time limit, to the exchangeable medium.

The 12th aspect of the present invention is a content utilization system comprising the download terminal according to the 1st aspect of the present invention and a writing-out license server, wherein when the writing-out license server receives a request for the writing-out license from the download terminal, the writing-out license server transmits to the download terminal, the writing-out license including the pack identifier and the viewing term information, of a content corresponding to the request for the writing-out license.

The 13th aspect of the present invention is a content utilization system comprising the download terminal according to the 2nd aspect of the present invention and a writing-out license server, wherein when the writing-out license server receives a request for the writing-out license from the download terminal, the writing-out license server transmits to the download terminal, the writing-out license including the pack identifier and the viewing term information, of a content corresponding to the request for the writing-out license.

The 14th aspect of the present invention is a content utilization system comprising a download terminal and a license server, wherein the license server transmits a viewing license including a viewing time constraint information for a content, according to a request for the viewing license to view the content, transmits a writing-out license including the viewing time constraint information, according to a request for the writing-out license to write out a content to an exchangeable medium, and receives a notification of determination of a viewing time limit of a content;

the download terminal includes a content acquisition unit which acquires the content from a content server, a license acquisition unit which acquires the viewing license and the writing-out license from the license server, a time limit determination unit which determines a viewing time limit of a content based on the viewing time constraint information when the content is written out to an exchangeable medium and if the viewing time limit of the content has not been determined, a time limit notification unit which notifies a determination of the viewing time limit to the license server when the time limit determination unit determines the viewing time limit, and a content writing-out unit which writes out the content and the determined viewing time limit to the exchangeable medium according to the writing-out license;

the license server sets viewing time limit information as the viewing time constraint information when a viewing time limit of the content of which the viewing license or the writing-out license is requested has been determined already, and the license server sets viewing term information as the viewing time constraint information when the viewing time limit has not been determined; and when the license server receives the notification of determination for the viewing time limit from the download terminal, if there is a content which belongs to the same content group as that of the notified content and which has not been acquired yet by the download terminal, the license server sets the notified and determined viewing time limit to a viewing time limit of the content which has not been acquired yet by the download terminal.

The 15th aspect of the present invention is the content utilization system according to the 14th aspect of the present invention, wherein the license server includes a viewing license server which transmits the viewing license and a writing-out license server which transmits the writing-out license; and when the time limit determination unit determines the viewing time limit, the time limit notification unit in the download terminal transmits the determination of the viewing time limit, to at least one of the viewing license server and the writing-out license server.

The 16th aspect of the present invention is a content utilization system comprising a download terminal and a license server, wherein the license server transmits a viewing license including a viewing time constraint information for a content, according to a request for the viewing license to view the content, and receives a notification of determination of a viewing time limit of a content;

the download terminal includes a content acquisition unit which acquires the content from a content server, a license acquisition unit which acquires the viewing license from the license server, a time limit determination unit which determines a viewing time limit of a content based on the viewing time constraint information when the content is written out to an exchangeable medium and if the viewing time limit of the content has not been determined, a time limit notification unit which notifies a determination of the viewing time limit to the license server when the time limit determination unit determines the viewing time limit, and a content writing-out unit which writes out the content and the determined viewing time limit to the exchangeable medium;

the license server sets viewing time limit information as the viewing time constraint information when a viewing time limit of the content the viewing license of which is requested has been determined already, and the license server sets viewing term information as the viewing time constraint information when the viewing time limit has not been determined; and when the license server receives the notification of determination for the viewing time limit from the download terminal, if there is a content which belongs to the same content group as that of the notified content and which has not been acquired yet by the download terminal, the license server sets the notified and determined viewing time limit to a viewing time limit of the content which has not been acquired yet by the download terminal.

The 17th aspect of the present invention is the content utilization system according to the 14th aspect of the present invention, wherein one server serves as the content server and the license server.

The 18th aspect of the present invention is the content utilization system according to the 16th aspect of the present invention, wherein one server serves as the content server and the license server.

The 19th aspect of the present invention is the content utilization system according to the 14th aspect of the present invention, wherein the time limit notification unit in the download terminal transmits the request for the viewing license including a determination request of the viewing time limit, to the license server, without notifying of the determination of the viewing time limit to the license server by the time limit notification unit.

The 20th aspect of the present invention is the content utilization system according to the 16th aspect of the present invention, wherein the time limit notification unit in the download terminal transmits the request for the viewing license including a determination request of the viewing time limit, to the license server, without notifying of the determination of the viewing time limit to the license server by the time limit notification unit.

The present invention can provide a download terminal and a content utilization system capable of synchronizing viewing time limits of a plurality of contents that need to have the same viewing time limits even if some of the contents, the viewing time limits of which are not determined yet, among the plurality of contents are written out to an exchangeable medium before the viewing time limits are determined.

BRIEF DESCRIPTION OF THE DRAWINGS

FIG. 2(A) is a schematic diagram showing a viewing license according to the first embodiment of the present invention;

FIG. 2(B) is a schematic diagram showing a writing-out license with viewing time limit according to the first embodiment of the present invention;

FIG. 2(C) is a schematic diagram showing a writing-out license with viewing term according to the first embodiment of the present invention;

FIGS. 3(A) to 3(D) are diagrams showing download content lists on a storage medium in a download terminal according to the first embodiment of the present invention;

FIG. 4 is a diagram showing a download content list on an SD card according to the first embodiment of the present invention;

FIG. 6 is a flow chart of a process for reproducing a content on the SD card according to the first embodiment of the present invention;

FIG. 7 is a flow chart of a writing-out license providing process in a license server according to embodiments of the present invention;

FIG. 9(A) is a schematic diagram showing a viewing license with viewing time limit according to the second embodiment of the present invention;

FIG. 9(B) is a schematic diagram showing a viewing license with viewing term according to the second embodiment of the present invention;

FIG. 9(C) is a schematic diagram showing a writing-out license with viewing time limit according to the second embodiment of the present invention;

FIG. 9(D) is a schematic diagram showing a writing-out license with viewing term according to the second embodiment of the present invention;

FIGS. 10(A) and 10(B) are diagrams showing download content lists on a storage medium in a download terminal according to the second embodiment of the present invention;

FIG. 11 is a diagram showing a download content list on an SD card according to the second embodiment of the present invention;

FIG. 17(A) is a schematic diagram showing a viewing license with viewing time limit according to the third and the fourth embodiments of the present invention;

FIG. 17(B) is a schematic diagram showing a viewing license with viewing term according to the third and the fourth embodiments of the present invention;

FIG. 17(C) is a schematic diagram showing a writing-out license with viewing time limit according to the third and the fourth embodiments of the present invention;

FIG. 17(D) is a schematic diagram showing a writing-out license with viewing term according to the third and the fourth embodiments of the present invention;

FIGS. 18(A) to 18(C) are diagrams showing download content lists on a storage medium in a download terminal according to the third and the fourth embodiments of the present invention;

FIG. 19 is a diagram showing a download content list on the SD card according to the third and the fourth embodiments of the present invention;

DESCRIPTION OF SYMBOLS

Figure 1:
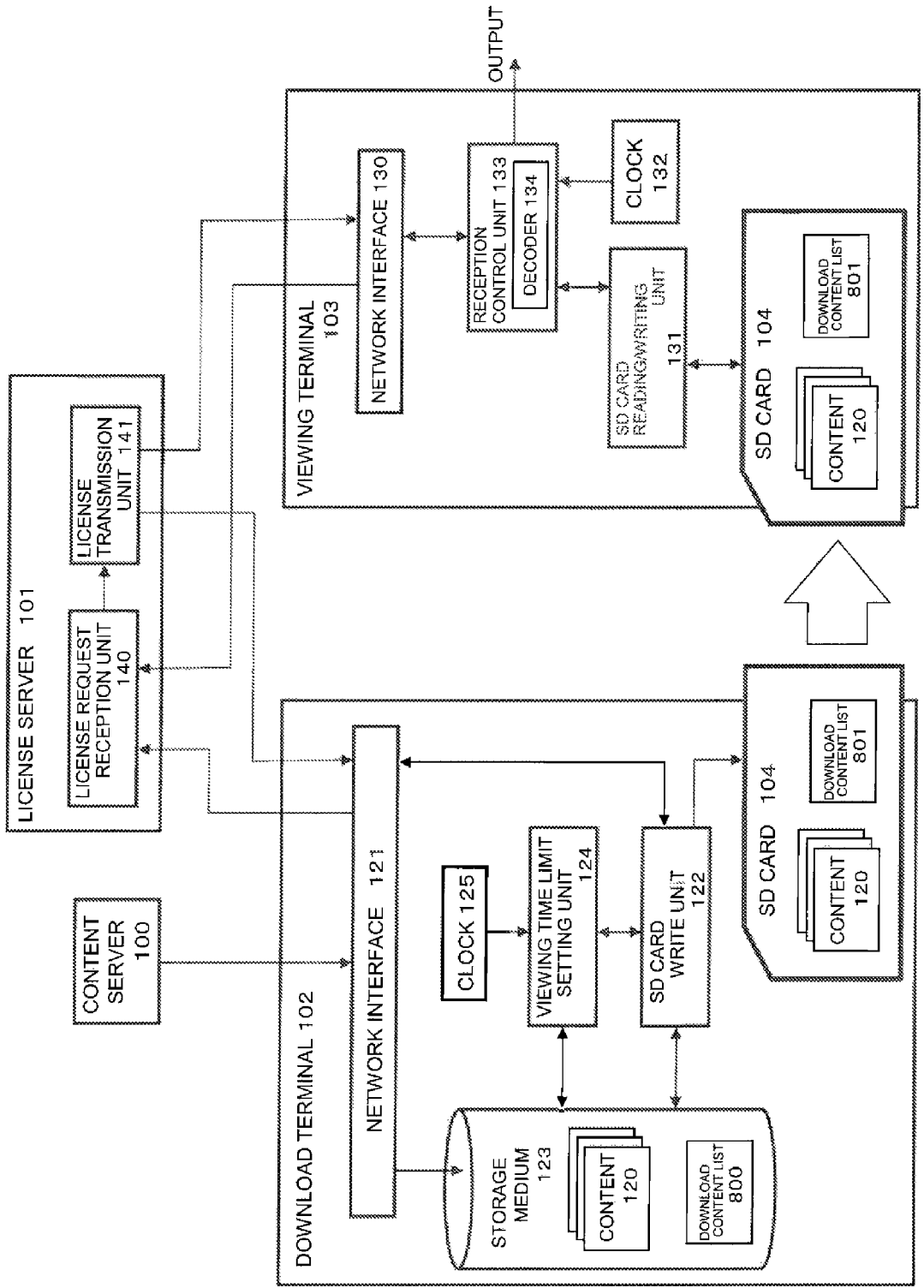
FIG. 1 is a block diagram of a content utilization system according to a first embodiment of the present invention.

100 Content server
101, 108, 112 License server
102, 105, 109, 111 Download terminal
103, 106 Viewing terminal
104, 107, 110 SD card
120, 150, 151 Content
121, 156, 170, 175 Network interface
122, 152 SD card write unit
123, 153 Storage medium
124, 154, 171, 176 Viewing time limit setting unit
125, 155 Clock
130 Network interface
131, 160 SD card reading/writing unit
132, 161 Clock
133, 162 Reproduction control unit
134, 163 Decoder
140, 183 License request reception unit
141, 181 License transmission unit
157 Reproduction control unit
158 Decoder
172 Viewing time limit notification unit
177 Viewing license acquisition unit
180 Request reception unit
182 Viewing time limit setting unit
600 Server
601 Download terminal
602 Viewing terminal
605 HDD
606 SD card
702 Decryption key
703 Viewing term
704 Viewing time limit
705 Content ID
711 Media type
713 License type
714 Pack ID
800, 801, 802, 803, 804, 805 Download content list
820 Viewing license
824, 828 Viewing license with viewing time limit
825, 829 Viewing license with viewing term
822, 826, 830 Writing-out license with viewing time limit
823, 827, 831 Writing-out license with viewing term

PREFERRED EMBODIMENTS OF THE INVENTION

Embodiments of the present invention are explained below with reference to the drawings.

First Embodiment

FIG. 1 is a block diagram of a content utilization system according to a first embodiment of the present invention.

A download terminal 102 is connected to a content server 100 and a license server 101 through the Internet (not shown).

The download terminal 102 in the first embodiment is an apparatus of exclusive use for writing-out, which does not have a function of reproducing a downloaded content by itself. The download terminal 102 writes out the downloaded content to an SD card 104 according to a writing-out license (a.k.a. an export license) received from the license server 101.

A network interface 121 in the download terminal 102 downloads an encrypted content from the content server 100, to which the network interface 121 is connected through the Internet, to store the encrypted content as content 120 in a storage medium 123, such as an HDD.

When an SD card write unit 122 accepts an instruction (not shown) to write out a content from the user, the SD card write unit 122 acquires a writing-out license from the license server 101 and stores information on the viewing license as a download content list 800. The SD card write unit 122, according to the acquired writing-out license, writes out the content 120, which has been stored in the storage medium 123, to an SD card 104 and records a download content list 801 related to the content to the SD card 104.

When the content 120 stored in the storage medium 123 is written out to the SD card 104, if a viewing time limit of the content 120 has not been determined, a viewing time limit setting unit 124 determines the viewing time limit of the content 120 based on the present time acquired from a clock 125.

The SD card 104 corresponds to an example of an exchangeable medium according to the present invention. The SD card writ unit 122 corresponds to an example of a content writing-out unit according to the present invention. The viewing time limit setting unit 124 corresponds to an example of a time limit determination unit according to the present invention.

A viewing terminal 103 is a portable terminal such as a cell phone, and is connected to the license server 101 through the Internet (not shown).

The SD card 104, to which the contents 120 has been written out by the download terminal 102, is inserted into the viewing terminal 103. When reproduction of one of the contents 120 on the SD card 104 is ordered thorough an instruction from the user (not shown), a reproduction control unit 133 causes an SD card reading/writing unit 131 to read out the download content list 801 from the SD card 104.

The reproduction control unit 133 acquires the viewing time limit information on the target content from the download content list 801, compares the viewing time limit information with the present time acquired from a clock 132 to judge whether the viewing time limit is not exceeded.

When the viewing time limit is not exceeded, the reproduction control unit 133 judges that the content can be reproduced, acquires a viewing license of the content from the license server 101 by a network interface 130, sets a content decryption key included in the acquired viewing license to a decoder 134, reads out the encrypted content 120 by the SD card reading/writing unit 131, and starts decryption and reproduction. When the viewing time limit is exceeded, the reproduction control unit 133 deletes the content 120 on the SD card 104.

In the license server 101, a license transmission unit 141 sends a license corresponding to the designated content back to the terminal of transmission source when a license request reception unit 140 receives a license request from the download terminal 102 or the viewing terminal 103.

FIGS. 2(A) to 2(C) are diagrams showing the viewing license supplied by the license server 101 to the viewing terminal 103 and the writing-out licenses supplied by the license server 101 to the download terminal 102 in the first embodiment.

FIG. 2(A) shows a viewing license 820. FIG. 2(B) shows a writing-out license 822 with viewing time limit which includes information on a determined viewing time limit. FIG. 2(C) shows a writing-out license 823 with viewing term which includes information on an undetermined viewing time limit.

The viewing license 820 includes a license type 713 indicative of a viewing license, a content ID 705 as an identifier of a target content, and a decryption key 702 for decoding an encrypted content.

The writing-out license 822 with viewing time limit includes the license type 713 indicative of a license with viewing time limit, the content ID 705 as the identifier of a target content, a pack ID 714 as a group identifier of pack content, a viewing term 703 indicating a period during which the target content can be viewed, a viewing time limit 704 indicating a determined period, during which the target content is allowed to be viewed, with viewing time limit start date/time and viewing time limit end date/time that are indicated by absolute date/time, and a media type 711 indicating a medium to which content can be written out by the license.

Although the configuration of the writing-out license 823 with viewing term is similar to that of the writing-out license 822 with viewing time limit, there are differences between the two in entry of significant values concerning the viewing term 703, the viewing time limit start, and the viewing time limit end. "(N. A.)" in FIGS. 2(B) and 2(C) means that no significant value is entered.

The same pack ID 714 is provided for each of the pack contents belonging to the same content group. As described above, the same viewing time limit needs to be set to the pack contents belonging to the same content group.

The pack ID 714, which is included in the writing-out license 822 with viewing time limit and the writing-out license 823 with viewing term, corresponds to an example of a pack identifier according to the present invention. The viewing term 703, which is included in the writing-out license 822 with viewing time limit and the writing-out license 823 with viewing term, corresponds to an example of a viewing term information according to the present invention. Information on the viewing term 703, the viewing time limit 704 and the media type 711, which are included in the writing-out license 822 with viewing time limit and the writing-out license 823 with viewing term, corresponds to an example of a use condition for writing out of the content to an exchangeable medium according to the present invention.

FIGS. 3(A) to 3(D) show the download content lists 800 as specific forms of the writing-out licenses for the content 120 stored in the download terminal 102 according to the first embodiment.

The information included in the writing-out license acquired from the license server 101 in order to write out the content is written in the download content list 800 content by content.

FIG. 3(A) shows details of record in the download content list 800, which was recorded when the writing-out licenses for the contents with entry numbers 1 and 2 were acquired.

Significant values are specified in the viewing time limit start and viewing time limit end indicating the viewing time limit 704 regarding the content designated by entry number 1, which shows that the viewing time limit of the content is already determined. On the other hand, significant values are not specified in the viewing time limit start and viewing time limit end regarding the content designated by entry number 2, and a significant value is specified only in the viewing term 703, which shows that the content designated by entry number 2 is a content the viewing time limit of which is managed but the time limit of the content is not determined.

FIG. 3(B) shows details of record in the download content list 800 after determination of the viewing time limit at the time of writing-out of the content with entry number 2 to the SD card 104.

FIG. 3(C) shows details of record in the download content list 800 at the time of acquisition of the writing-out licenses for the contents with entry numbers 3 and 4. FIG. 3(D) shows details of record in the download content list 800 after determination of the viewing time limit at the time of writing-out of the content with entry number 4 to the SD card 104.

FIG. 4 shows the download content list 801 as a specific form of the viewing time limit information written in the SD card 104 according to the first embodiment. As shown in FIG. 4, the information on the content ID 705 and the viewing time limit 704 among the information recorded in the download content list 800 shown in FIG. 3(D) are written into the download content list 801. In addition to such information, information on the pack ID 714 can be written into the download content list 801.

Figure 5:
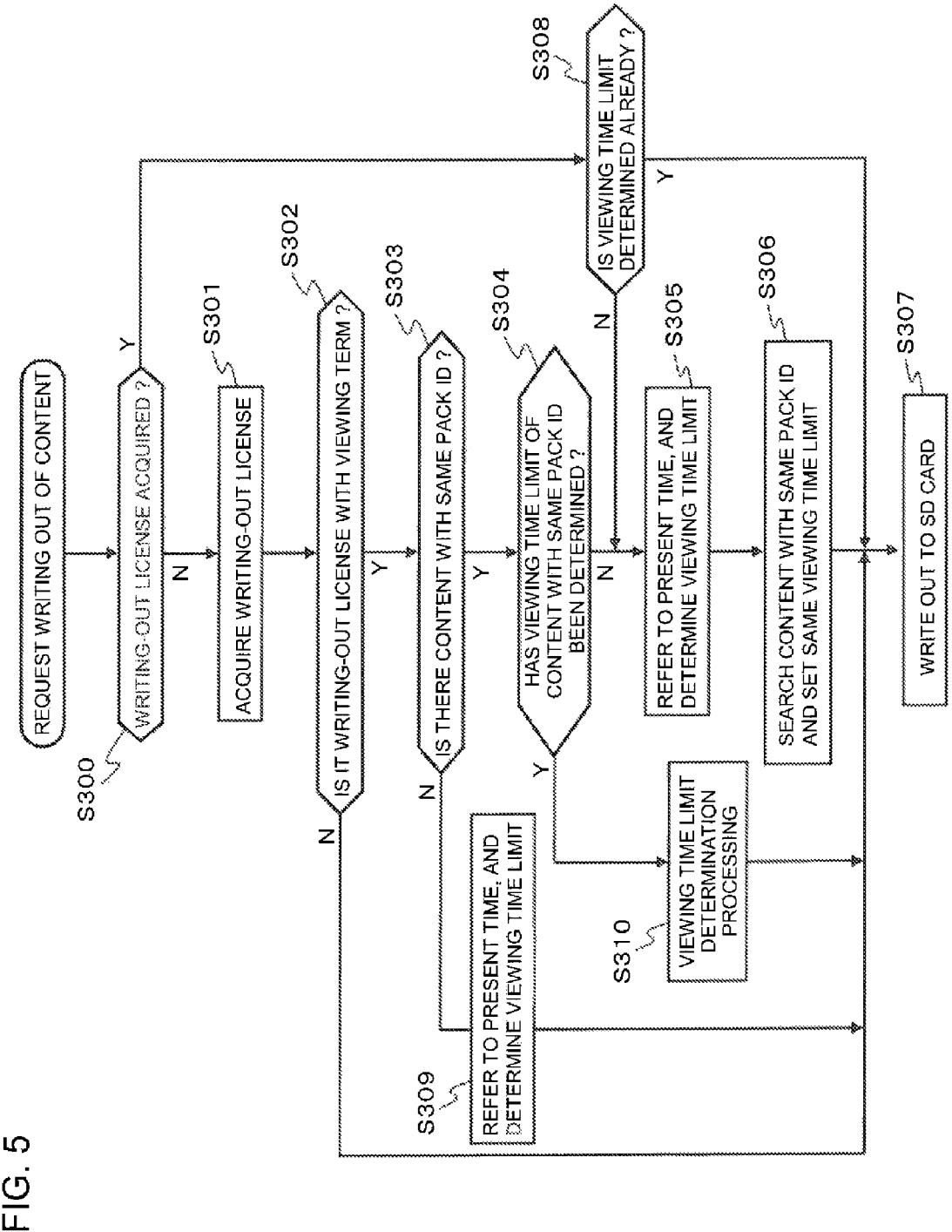
FIG. 5 is a flow chart of a process for writing out a pack content to the SD card according to the first embodiment of the present invention.

FIG. 5 is a flow chart of a writing-out process at the time of writing-out of the pack content 120 stored in the storage medium 123 to the SD card 104 by the download terminal 102 of the first embodiment.

FIG. 6 is a flow chart of a viewing start process at the time of view of the pack content 120 recorded in the SD card 104 at the viewing terminal 103 according to the first embodiment.

FIG. 7 is a flow chart of a writing-out license providing process in the license server 101 of the first embodiment.

Operations of the content utilization system of the first embodiment in the case of handling download contents the viewing time limits of which are not determined at first will be described.

When the content 120, which has been downloaded and stored in the storage medium 123, is written out to the SD card 104, the SD card write unit 122 and the viewing time limit setting unit 124 of the download terminal 102 control the writing-out in accordance with the flow shown in FIG. 5.

The SD card write unit 122 checks whether the writing-out license for a target content to be written out has been already acquired (step S300). When the writing-out license is not acquired yet, the SD card write unit 122 requests the writing-out license from the license server 101 through the network interface 121, and acquires the writing-out license from the license server 101 (step S301).

When the license server 101 receives the request for the writing-out license, the license server 101 performs a providing process of the writing-out license in accordance with the flow of FIG. 7.

When the license request reception unit 140 in the license server 101 receives the request for the writing-out license from the download terminal 102, the license request reception unit 140 judges whether the viewing time limit of the requested content 120 has been determined or not (step S330). When the viewing time limit is already determined, the license transmission unit 141 transmits the writing-out license 822 with viewing time limit to the download terminal 102 (step S331). When the viewing time limit is not determined, the license transmission unit 141 transmits the writing-out license 823 with viewing term to the download terminal 102 (step S332).

The SD card write unit 122 judges whether the writing-out license received from the license server 101 is the writing-out license 822 with viewing time limit or whether it is the writing-out license 823 with viewing term (step S302).

Here, it is assumed that the target content 120 to be written out is a content with entry number 2 of FIG. 3(A).

Since the viewing time limit of the content with entry number 2 of FIG. 3(A) has not been determined, the writing-out license 823 with viewing term is acquired. Next, the SD card write unit 122 causes the viewing time limit setting unit 124 to search for other writing-out licenses having the same pack ID 714.

The viewing time limit setting unit 124 refers to the download content list 800 and searches for the contents having the same pack ID 714 as that of the target content 120 to be written out (step S303). In this case, as shown in FIG. 3(A), the contents described in the download content list 800 are two contents with entry numbers 1 and 2. Since the content with entry number 1 is not a pack content, it is judged that there is no content having the same pack ID 714 as that of the target content 120 to be written out.

Since there is no writing-out license of the content having the same pack ID 714, the viewing time limit setting unit 124 next performs a determining process of the viewing time limit (step S309). The viewing time limit setting unit 124 acquires the present time from the clock 125 and determines the viewing time limit 704. As shown in FIG. 3(B), the viewing time limit setting unit 124 writes a value of the present time as the viewing time limit start in the download content list 800, and writes a value obtained by adding the viewing term 703 to the present time as the viewing time limit end.

The SD card write unit 122 performs a writing-out process to the SD card 104 by using the writing-out license received from the license server 101 (step S307). In this case, the values of the download content list 800 are copied to the areas of the download content list 801 to be written out to the SD card 104.

When the contents with entry numbers 3 and 4 are also written out in addition to the contents with entry numbers 1 and 2, as shown in FIG. 3(C), the content with entry number 4 is a content the viewing time limit of which has not been determined.

Therefore, the writing-out license which is acquired for the content with entry number 4 is the writing-out license 823 with viewing term, and the writing-out license 823 with viewing term is recorded in the download content list 800 as shown in FIG. 3(C).

When the writing-out license for the content with entry number 4 is acquired, as shown in FIG. 3(C), the pack ID 714 with entry number 2 is the same as the pack ID 714 with entry number 4. Therefore, in step S303, it is judged that there is a writing-out license for a content having the same pack ID 714.

And, the viewing time limit setting unit 124 searches for the contents the viewing time limits of which are determined (step S304) among the contents having the same pack ID 714, the writing-out licenses of which are acquired. Since the viewing time limit of the content with entry number 2 having the same pack ID 714 is determined, the viewing time limit setting unit 124 determines the viewing time limit of the content with entry number 4 by using the same value as that of the viewing time limit of the content with entry number 2. As shown in FIG. 3(D), the viewing time limit setting unit 124 records the same value as that of the viewing time limit 704 with entry number 2 to a column of the viewing time limit 704 with entry number 4 in the download content list 800 (step S310).

The SD card write unit 122 performs the writing-out process of writing out, to the SD card 104, the download content list 800 shown in FIG. 4 and the contents with entry numbers 1 to 4 (step S307).

In step S304, when there is no content the viewing time limit of which has been determined among the contents having the same pack ID 714, the viewing time limit setting unit 124 acquires the present time from the clock 125 and determines the viewing time limit of the target content to be written out (step S305). Further, the viewing time limit setting unit 124 also determines the viewing time limits of the other contents having the same pack ID 714 by setting the same viewing time limits as the determined viewing time limit, and records the viewing time limits in the download content list 800 (step S306).

In the above, when the process for the content with entry number 4 is performed, the viewing time limit of the content with entry number 2 having the same pack ID 714 has been already determined. On the other hand, when the viewing time limit of the content with entry number 2 is not determined at that time, the viewing time limit of the content with entry number 4 is first determined (step S305), and the same viewing time limit is set as the viewing time limit of the content with entry number 2 having the same pack ID 714 (step S306).

The viewing time limit setting unit 124 which sets the same viewing time limit to the content having the same pack ID 714 in step S306 corresponds to an example of a pack time limit determination unit according to the present invention.

In step S300, when the writing-out license of the target content to be written out has been acquired, in other words, when an entry of the content has been recorded in the download content list 800, the viewing time limit setting unit 124 judges whether the viewing time limit of the content has been determined (step S308). When the viewing time limit has been determined, the SD card write unit 122 performs the writing-out process of the content to the SD card (step S307). When the viewing time limit has not been determined, the viewing time limit setting unit 124 performs the determining process of the viewing time limit of steps S305 and S306.

Next, the content which has been written out to the SD card 104 by the download terminal 102 is viewed at the viewing terminal 103.

The viewing terminal 103 controls the reproduction of the content on the SD card 104 in accordance with the flow shown in FIG. 6.

When reproduction of the content recorded in the SD card 104 is ordered thorough an instruction from the user (not shown), the reproduction control unit 133 checks whether the viewing license of the target content 120 has been acquired (step S320).

When the viewing license of the content 120 has not been acquired yet, the reproduction control unit 133 acquires the viewing license of the content 120 from the license server 101 by the network interface 130 (step S321).

In the license server 101, the license transmission unit 141 transmits the viewing license 820 of the requested content 120 to the viewing terminal 103 when the license request reception unit 140 receives the viewing license request from the viewing terminal 103.

The reproduction control unit 133 reads out the download content list 801 recorded in the SD card 104 by the SD card reading/writing unit 131, and judges whether the viewing time limit of the content 120 is not exceeded based on the information on the viewing time limit 704 of the content 120 (step S322).

The reproduction control unit 133 compares the date and time of the viewing time limit 704 with the present time acquired from the clock 132. When the viewing time limit is already exceeded, the reproduction control unit 133 deletes the content (step S324). When the viewing time limit is not exceeded, the reproduction control unit 133 sets the content decryption key included in the viewing license 820 to the decoder 134, reads out the encrypted content 120 from the SD card 104, and starts decryption and reproduction (step S323).

As described above in the first embodiment, when the content 120 the viewing time limit of which is undetermined is to be written out to the SD card 104, the content 120 is written out to the SD card with the download content list 801 including the information on the determined viewing time limit after the viewing time limit has been determined (steps S305, S309 and S310). Since the information on the pack ID 714, the viewing term 703 and the viewing time limit 704 are included in the writing-out license, the viewing time limit of the other contents having the same pack ID 714 is also determined (steps S306 and S310) when the content 120 is written out to the SD card 104 by using the information.

Since the contents which are written out to the SD card 104 and have the same pack ID 714 are allowed to be synchronized with each other using the same viewing time limit, the viewing time limits of the contents, which are written out to the SD card 104 from the download terminal 102 and belong to the same pack, are set using the same time limit. Therefore, the time limit synchronization can be secured.

In the description of the first embodiment, the download terminal 102 writes out the content 120 stored in the storage medium 123 to the SD card 104. The viewing time limit determination method of the first embodiment can be applied to a case of a direct export such that the content downloaded from the content server 100 is directly written in the SD card without being stored in the download terminal 102.

Second Embodiment

Figure 8:
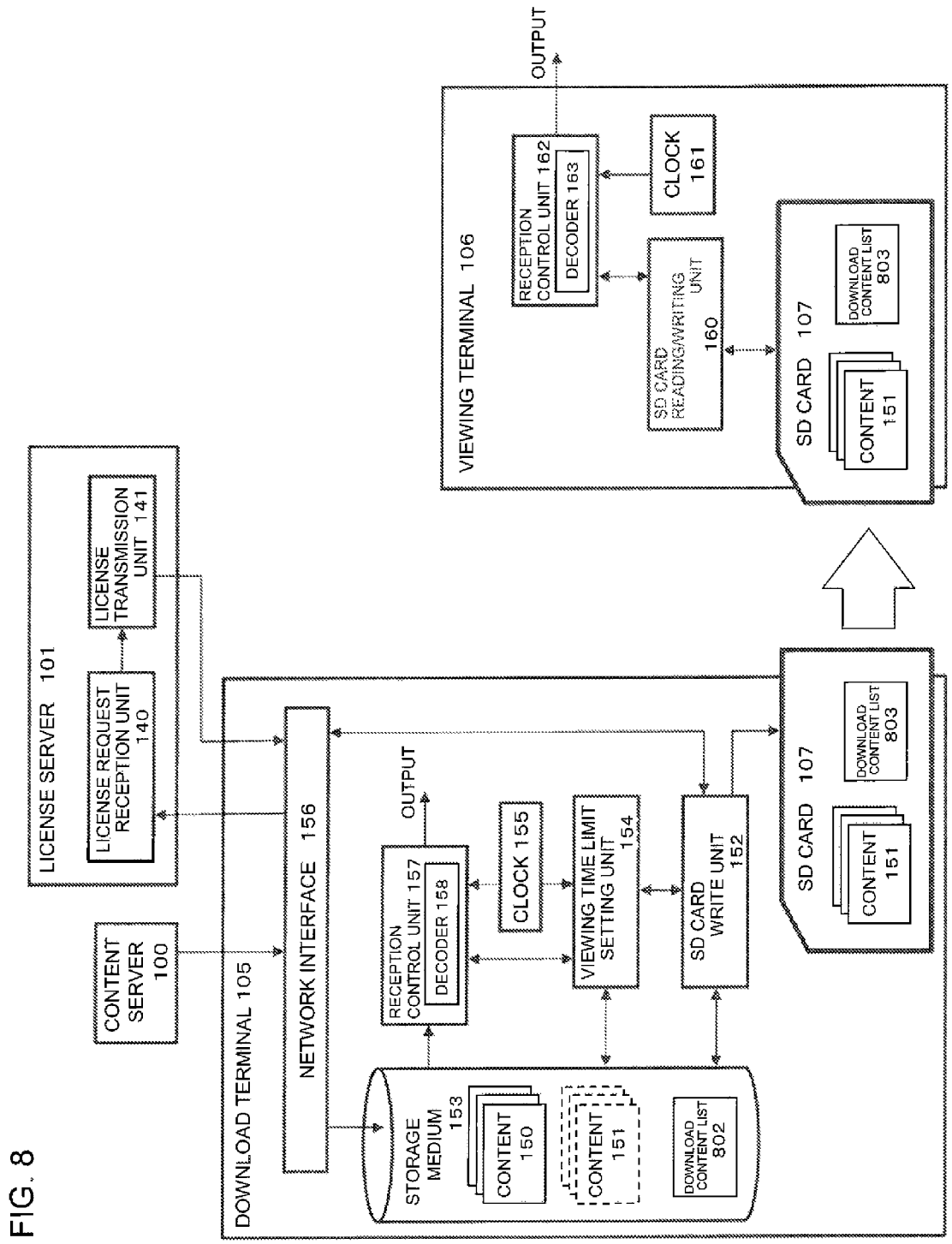
FIG. 8 is a block diagram of a content utilization system according to a second embodiment of the present invention.

FIG. 8 is a block diagram of a content utilization system according to a second embodiment of the present invention. In FIG. 8, the components that are the same as those in FIG. 1 are denoted by the same reference numerals.

A download terminal 105 in the second embodiment has a function of acquiring a viewing license to reproduce a downloaded content by itself according to the viewing license.

In the content utilization system of the second embodiment, when the download terminal 105 writes out the content to an SD card 107, the download terminal 105 also writes out a download content list 803 as the viewing license for the content. Therefore, when viewing of the content written out to the SD card 107 is started, the content can be viewed without acquiring the viewing license anew.

The download terminal 105 is connected to the content server 100 and the license server 101 through the Internet (not shown).

A network interface 156 in the download terminal 105 downloads encrypted contents from the content server 100, to which the network interface 156 is connected through the Internet, to store the encrypted contents as contents 150 and 151 in a storage medium 153, such as an HDD. The network interface 156 acquires the viewing licenses for the downloaded contents 150 and 151 from the license server 101 to store the viewing licenses as download content list 802.

A reproduction control unit 157 accepts an instruction (not shown) from the user. When the instruction from the user is an instruction to reproduce any of the stored contents stored, the reproduction control unit 157 checks the viewing conditions of the target content. When the reproduction control unit 157 judges that the target content can be reproduced, the reproduction control unit 157 sets a content decryption key to a decoder 158, reads out the encrypted contents 150 and 151, and starts decryption and reproduction.

When the reproduction control unit 157 checks the viewing conditions, the reproduction control unit 157 acquires the viewing time limit of the target content from the download content list 802, and judges whether the viewing time limit is not exceeded, by comparing the viewing time limit with the present time acquired from a clock 155.

When an SD card write unit 152 accepts an instruction (not shown) to write out a content from the user, the SD card write unit 152 acquires a writing-out license from the license server 101. The SD card write unit 152, according to the acquired writing-out license, writes out the contents 150 and 151 to the SD card 107 and records the download content list 803 related to the content to the SD card 107.

When the contents 150 and 151 stored in the storage medium 153 are written out to the SD card 107, if the viewing time limits of the contents 150 and 151 have not been determined, a viewing time limit setting unit 154 determines the viewing time limits of the contents 150 and 151 based on the present time acquired from the clock 155.

The SD card 107, to which the content 151 has been written out by the download terminal 105, is inserted into the viewing terminal 106. When reproduction of the content 151 on the SD card 107 is ordered through an instruction from the user (not shown), a reproduction control unit 162 reads out the download content list 803 from the SD card 107.

The reproduction control unit 162 acquires the viewing time limit information on the target content from the download content list 803, and compares the viewing time limit information with the present time acquired from a clock 161 to judge whether the viewing time limit is not exceeded.

When the viewing time limit is not exceeded, the reproduction control unit 162 judges that the content can be reproduced, acquires a content decryption key from the download content list 803, sets the content decryption key to a decoder 163, reads out the encrypted content 151 by an SD card reading/writing unit 160, and starts decryption and reproduction. When the viewing time limit is exceeded, the reproduction control unit 162 deletes the content 151 on the SD card 107.

FIGS. 9(A) to 9(D) are diagrams showing the viewing licenses and the writing-out licenses supplied by the license server 101 to the download terminal 105 in the second embodiment.

FIG. 9(A) shows a viewing license 824 with viewing time limit which includes information on a determined viewing time limit. FIG. 9(B) shows a viewing license 825 with viewing term which includes information on an undetermined viewing time limit. FIG. 9(C) shows a writing-out license 826 with viewing time limit which includes information on a determined viewing time limit. FIG. 9(D) shows a writing-out license 827 with viewing term which includes information on an undetermined viewing time limit.

The viewing license 824 with viewing time limit includes the license type 713 indicative of a license with the viewing time limit, the content ID 705, the pack ID 714, the decryption key 702, the viewing term 703 indicating the period during which the target content can be viewed, the viewing time limit 704 indicating the determined period, during which the target content is allowed to be viewed, by the viewing time limit start date/time and the viewing time limit end date/time indicated by absolute date/time.

Although the configuration of the viewing license 825 with viewing term is similar to that of the viewing license 824 with viewing time limit, there are differences between the two in entry of significant values concerning the viewing term 703, the viewing time limit start, and the viewing time limit end.

The media type 711 indicating the type of medium, to which a content can be written out by the license, is added to the writing-out license 826 with viewing time limit and the writing-out license 827 with viewing term.

The same pack ID 714 is provided for each of the pack contents belonging to the same content group.

In FIG. 8, the content 150 and the content 151 have the same pack ID 714. In the second embodiment, a case will be described, in which the content 151 is written out to the SD card 107 and the content 150 having the same pack ID as that of the content 151 is left in the download terminal 105.

When the license server 101 receives the request for the writing-out license, the license server 101 performs a providing process of the writing-out license in accordance with the flow of FIG. 7, as is the case with the first embodiment.

That is, when the license request reception unit 140 in the license server 101 receives the request for the writing-out license from the download terminal 105, the license request reception unit 140 judges whether the viewing time limit of the requested content has been determined or not (step S330). When the viewing time limit is already determined, the license transmission unit 141 transmits the writing-out license 826 with viewing time limit to the download terminal 105 (step S331). When the viewing time limit is not determined, the license transmission unit 141 transmits the writing-out license 827 with viewing term to the download terminal 105 (step S332).

Figure 15:
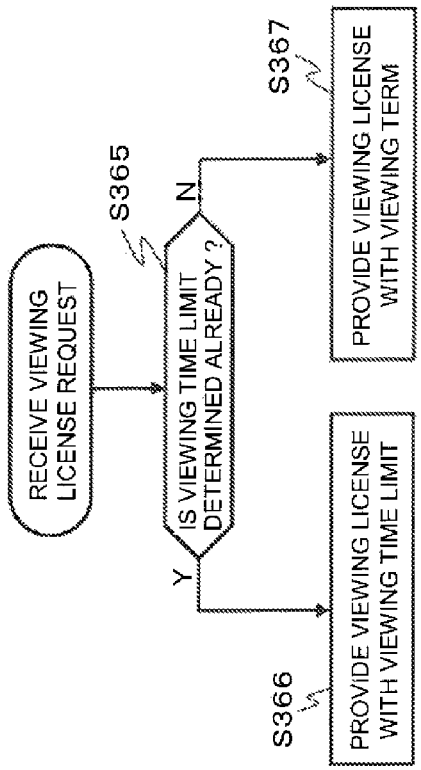
FIG. 15 is a flow chart of a viewing license providing process in a license server according to the second and the third embodiments of the present invention.

FIG. 15 is a flow chart of a viewing license providing process in the license server 101 of the second embodiment.

When the license server 101 receives the request for the viewing license, the license server 101 performs a providing process of the viewing license in accordance with the flow of FIG. 15.

When the license request reception unit 140 receives the request for the viewing license from the download terminal 105, the license request reception unit 140 judges whether the viewing time limit of the requested content has been determined or not (step S365). When the viewing time limit is already determined, the license transmission unit 141 transmits the viewing license 824 with viewing time limit to the download terminal 105 (step S366). When the viewing time limit is not determined, the license transmission unit 141 transmits the viewing license 825 with viewing term to the download terminal 105 (step S367).

FIGS. 10(A) and 10(B) show the download content lists 802 as specific forms of the viewing licenses stored in the download terminal 105 according to the second embodiment.

When the content is downloaded from the content server 100, the information included in the viewing license acquired from the license server 101 is written in the download content list 802 content by content.

FIG. 10(A) shows details of record in the download content list 802 when no content has been reproduced or written out at the download terminal 105. FIG. 10(B) shows details of record in the download content list 802 when the contents with entry numbers 1 to 4 are written out to the SD card 107 thereafter.

As shown in FIG. 10(A), the viewing time limits of the contents designated by entry numbers 1 and 3 have been determined before the contents are written out to the SD card 107. Regarding the contents designated by entry numbers 2 and 4, the viewing time limits are managed, but they are not determined. Accordingly, when the download terminal 105 acquires the viewing license from the license server 101, the viewing licenses 824 with viewing time limit are acquired for the contents with entry numbers 1 and 3, and the viewing licenses 825 with viewing term are acquired for the contents with entry numbers 2 and 4.

FIG. 11 shows the download content lists 803 as a specific form of the viewing license stored in the SD card 107 according to the second embodiment. As shown in FIG. 11, the information on the content ID 705, the decryption key 702 and the viewing time limit 704, which are included in the download content list 802, are written into the download content list 803. In addition to such information, information on the pack ID 714 can be written into the download content list 803.

Figure 12:
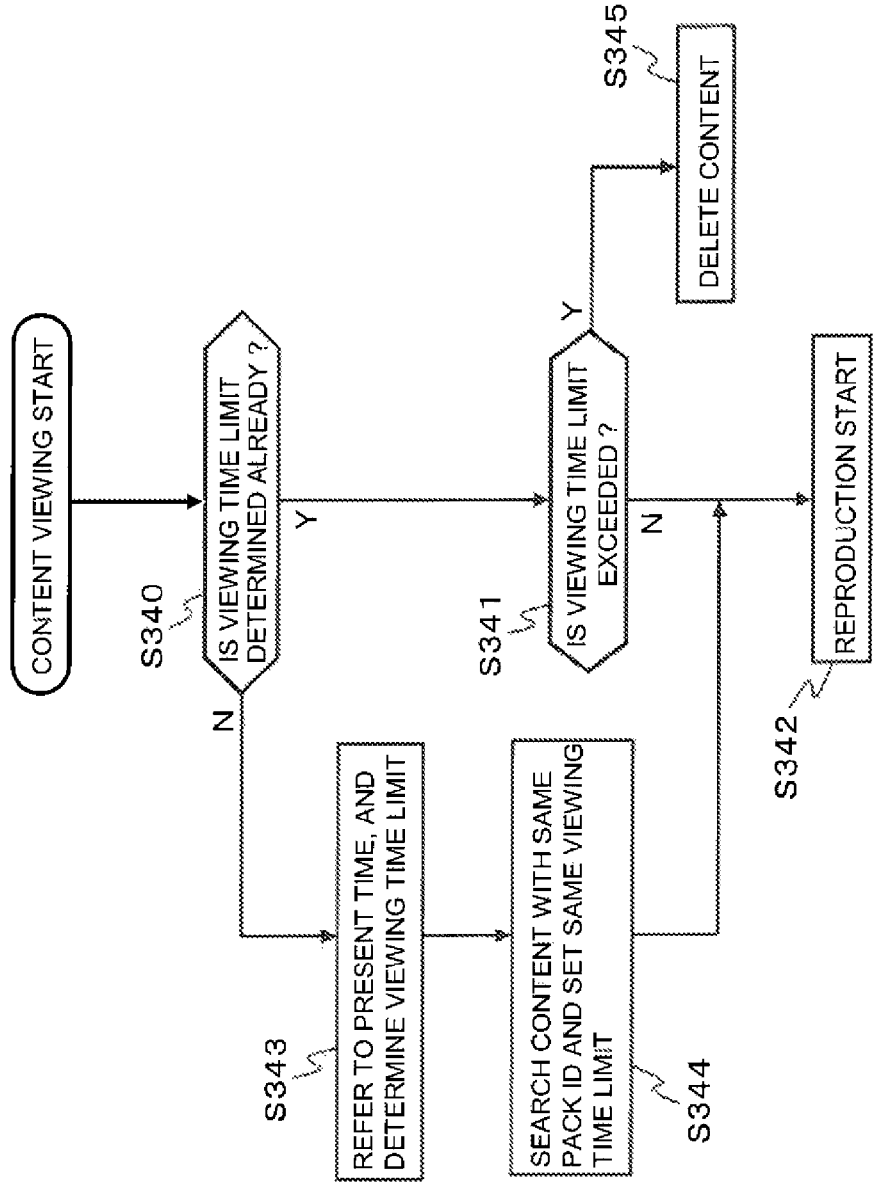
FIG. 12 is a flow chart showing a process for starting reproduction of a content stored in the download terminal according to the second embodiment of the present invention.

FIG. 12 is a flow chart of a viewing start process at the time of reproduction of the pack content 150 stored in the storage medium 153 at the download terminal 105 according to the second embodiment.

Figure 13:
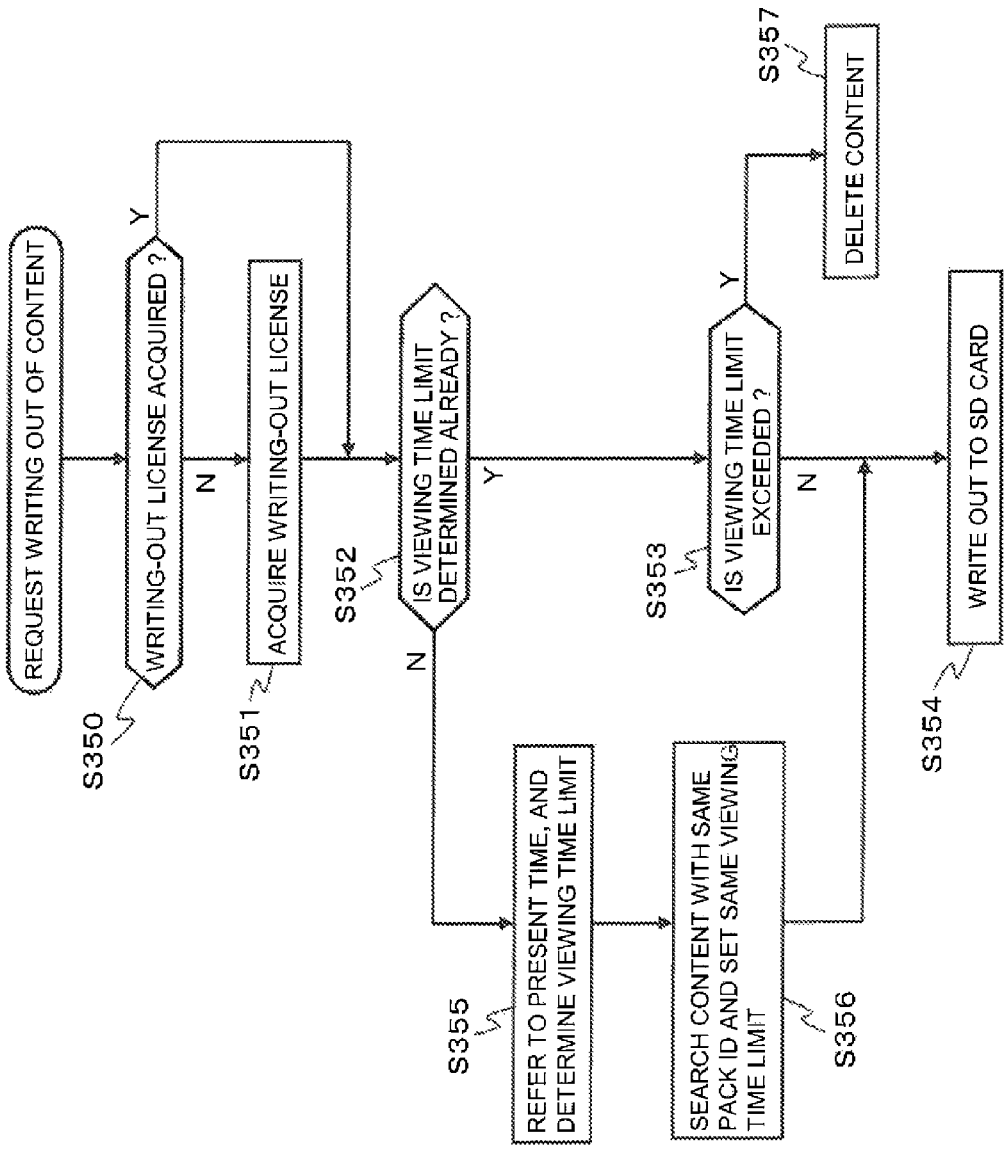
FIG. 13 is a flow chart of a process for writing out a pack content to the SD card according to the second embodiment of the present invention.

FIG. 13 is a flow chart of a writing-out process at the time of writing-out of the pack content 151 stored in the storage medium 153 to the SD card 107 by the download terminal 105 of the second embodiment.

Figure 14:
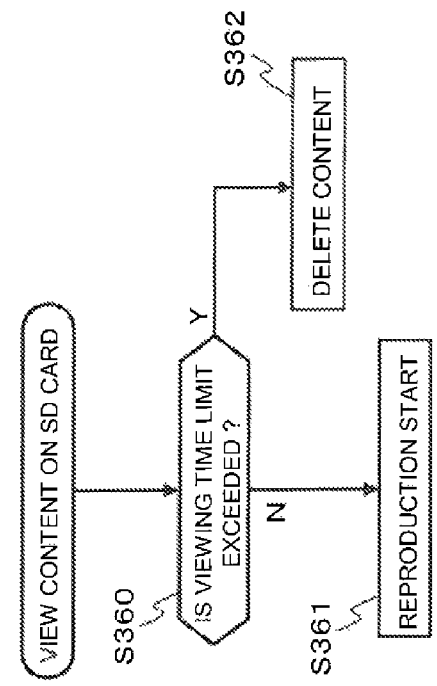
FIG. 14 is a flow chart of a process for reproducing a content on the SD card according to the second, a third and a fourth embodiments of the present invention.

FIG. 14 is a flow chart of a viewing start process at the time of view of the pack content 151 recorded in the SD card 107 at the viewing terminal 106 according to the second embodiment.

Operations of the content utilization system of the second embodiment for handling download contents will be described, assuming that the viewing time limit is undetermined at the beginning but is to be determined upon start of the first viewing.

Hereinafter, the following operations will be described one by one: (i) an operation to be carried out when a content having the same pack ID is written out to the SD card 107 after reproduction by the download terminal 105; and (ii) an operation to be carried out when some of the contents having the same pack ID are written out to the SD card 107 when no content having the same pack ID has been reproduced by the download terminal 105.

First, the operation is described, assuming that a content having the same pack ID is written out to the SD card 107 after reproduction of the content by the download terminal 105.

When a content, which has been downloaded from the content server 100 to be stored in the storage medium 153, is reproduced at the download terminal 105 before the content is written out to the SD card 107, the reproduction control unit 157 in the download terminal 105 controls the reproduction in accordance with the flow shown in FIG. 12.

The reproduction control unit 157 judges whether the viewing time limit has been determined according to the information on the viewing term 703 and the viewing time limit 704 in the download content list 802 (step S340).

When the content is reproduced for the first time at the download terminal 105, in step S340, the viewing time limit is not determined yet. Thus, the reproduction control unit 157 acquires the present time information from the clock 155 to set the present time to the viewing time limit start, adds the viewing term 703 to the viewing time limit start for calculating the viewing time limit end to determine the viewing time limit 704, and writes the dates and times into the download content list 802 (step S343).

The reproduction control unit 157 searches the download content list 802 for the contents having the same pack ID 714 as that of the content the viewing time limit of which has been just determined. When the contents having the same pack ID 714 exist, the reproduction control unit 157 specifies the same dates and times as to the viewing time limit start and the viewing time limit end with respect to all of the contents having the same pack ID 714 (step S344).

In this case, because the content 151 has the same pack ID as that of the target content 150 to be reproduced, the viewing time limit 704 of the content 151 is set using the same value as that of the determined viewing time limit 704 of the content 150. That is, the viewing time limit 704 of the content 151 is also determined at the same time.

For example, when the contents with entry numbers 2 and 4 shown in FIG. 10(A) are considered as the contents 150 and 151 respectively, the viewing time limit of the content with entry number 2 is determined by the processing of step S343. Furthermore, since the viewing time limit of the content with entry number 4 is also determined by the processing of step S344, the download content list 802 is updated as shown in FIG. 10(B).

And the reproduction control unit 157 starts the reproduction of the content 150 (step S342).

If the content has been reproduced before at the download terminal 105, the viewing time limit has been already determined at the time of the first reproduction of the content at the download terminal 105 (step S343). In this case, it is judged that the viewing time limit of the content has been determined in step S340. The reproduction control unit 157 then compares the viewing time limit 704 in the download content list 803 with the present time acquired from the clock 155 (step S341). When the viewing time limit is exceeded, the reproduction control unit 157 deletes the content (step S345). When the viewing time limit is not exceeded, the reproduction control unit 157 starts the reproduction of the content (step S342).

As described above, when the content 151 having the same pack ID 714 is written out to the SD card 107 after the content 150 is reproduced at the download terminal 105, the SD card write unit 152 of the download terminal 105 controls the writing-out in accordance with the flow shown in FIG. 13.

The SD card write unit 152 checks whether the writing-out license for the target content 151 to be written out has been already acquired (step S350). When the writing-out license is not acquired yet, the SD card write unit 152 requests the writing-out license from the license server 101 through the network interface 156, and acquires the writing-out license from the license server 101 (step S351).

Next, the SD card write unit 152 causes the viewing time limit setting unit 154 to judge whether the viewing time limit of the content 151 has been determined (step S352).

When the viewing time limit of the content 150 was determined at the time of the first reproduction of the content 150 (step S343), the same viewing time limit as that of the content 150 was set to the content 151 (step S344). Therefore in step S352, it is judged that the viewing time limit of the content 151 has been determined.

Next, the viewing time limit setting unit 154 refers to the download content list 802 and compares the viewing time limit of the content 151 with the present time acquired from the clock 155 (step S353). When the viewing time limit is already exceeded, the viewing time limit setting unit 154 deletes the content (step S357). When the viewing time limit is not exceeded, the SD card write unit 152 performs the writing-out process of the content to the SD card 107 by using the writing-out license acquired from the license server 101 (step S354). In this case, the values of the download content list 802 are copied to the areas of the download content list 803 to be written out to the SD card 107.

In the download content list 803 in this case, the viewing time limit 704 of the content 151 is set using the same viewing time limit as the viewing time limit of the content 150 which was determined when the content 150 having the same pack ID 714 was reproduced for the first time at the download terminal 105.

Next, the content 151 written out to the SD card 107 by the download terminal 105 is viewed at the viewing terminal 106.

The viewing terminal 106 controls the reproduction of the content on the SD card 107 in accordance with the flow shown in FIG. 14.

When reproduction of the content 151 recorded in the SD card 107 is ordered thorough an instruction from the user (not shown), the reproduction control unit 162 reads out the download content list 803 recorded in the SD card 107 by the SD card reading/writing unit 160, and judges whether the viewing time limit of the content 151 is not exceeded based on the information on the viewing time limit 704 of the content 151 (step S360).

The reproduction control unit 162 compares the date and time of the viewing time limit 704 with the present time acquired from the clock 161. When the viewing time limit is already exceeded, the reproduction control unit 162 deletes the content 151 (step S362). When the viewing time limit is not exceeded, the reproduction control unit 162 sets the content decryption key 702 of the content 151 included in the download content list 803 to the decoder 163, reads out the encrypted content 151 from the SD card 107, and starts decryption and reproduction (step S361).

Next, the operation is described, assuming that some of the contents having the same pack ID are written out to the SD card 107 when no content having the same pack ID has been reproduced by the download terminal 105.

In this case, when the instruction for writing-out to the SD card 107 is accepted, the viewing time limit of the target content 151 to be written out is not determined yet. Therefore, in step S352 of the flow of writing-out of content, it is judged that the viewing time limit of the content 151 is not determined.

Since the viewing time limit of the content 151 is not determined, the viewing time limit setting unit 154 next acquires the present time information from the clock 155 to set the present time to the viewing time limit start, adds the viewing term 703 to the viewing time limit start for calculating the viewing time limit end to determine the viewing time limit 704, and writes the dates and times into the download content list 802 (step S355).

The viewing time limit setting unit 154 searches the download content list 802 for the contents having the same pack ID 714 as that of the content the viewing time limit of which has been just determined. When the contents having the same pack ID 714 exist, the viewing time limit setting unit 154 specifies the same dates and times as to the viewing time limit start and the viewing time limit end with respect to all of the contents having the same pack ID 714 (step S356). In this case, since the content 150 has the same pack ID 714 as that of the content 151, as the viewing time limit of the content 150, the same dates and times as the viewing time limit determined for the content 151 is set.

When the content 151 is written out to the SD card 107 (step S354), the download content list 803, to which the values of the viewing time limit 704 that was determined in step S355 and recorded in the download content list 802 has been copied, is also written out to the SD card 107.

As described above in the second embodiment, when a content has been already reproduced at the download terminal 105 before the content is written out to the SD card 107, the viewing time limits of the contents which belong to the same pack are synchronized with the viewing time limit for the first reproduction. When the content is written out to the SD card 107 before the content is reproduced for the first time at the download terminal 105, the viewing time limits of the contents which belong to the same pack are synchronized with the viewing time limit for the first writing-out to the SD card 107. Therefore, the time limit synchronization can be secured.

In the above description, the writing-out license includes information on the pack ID 704, the viewing term 703 and the viewing time limit 714. Because the information included in the viewing license is used in the second embodiment, the writing-out license may not include such information.

In the second embodiment, the writing-out license is not needed for determining the viewing time limit because the information included in the viewing license is used as the information on the viewing term 703 and the viewing time limit 704. The operations of the second embodiment can be applied to a download terminal which can write out a content to an exchangeable medium such as an SD card not according to the writing-out license.

In the case of the download terminal which can write out a content to an exchangeable medium not according to the writing-out license, even if the writing-out license is not acquired from the license server 101 in the configuration of the second embodiment described above, the operations of the second embodiment can be applied to the download terminal.

Third Embodiment

Figure 16:
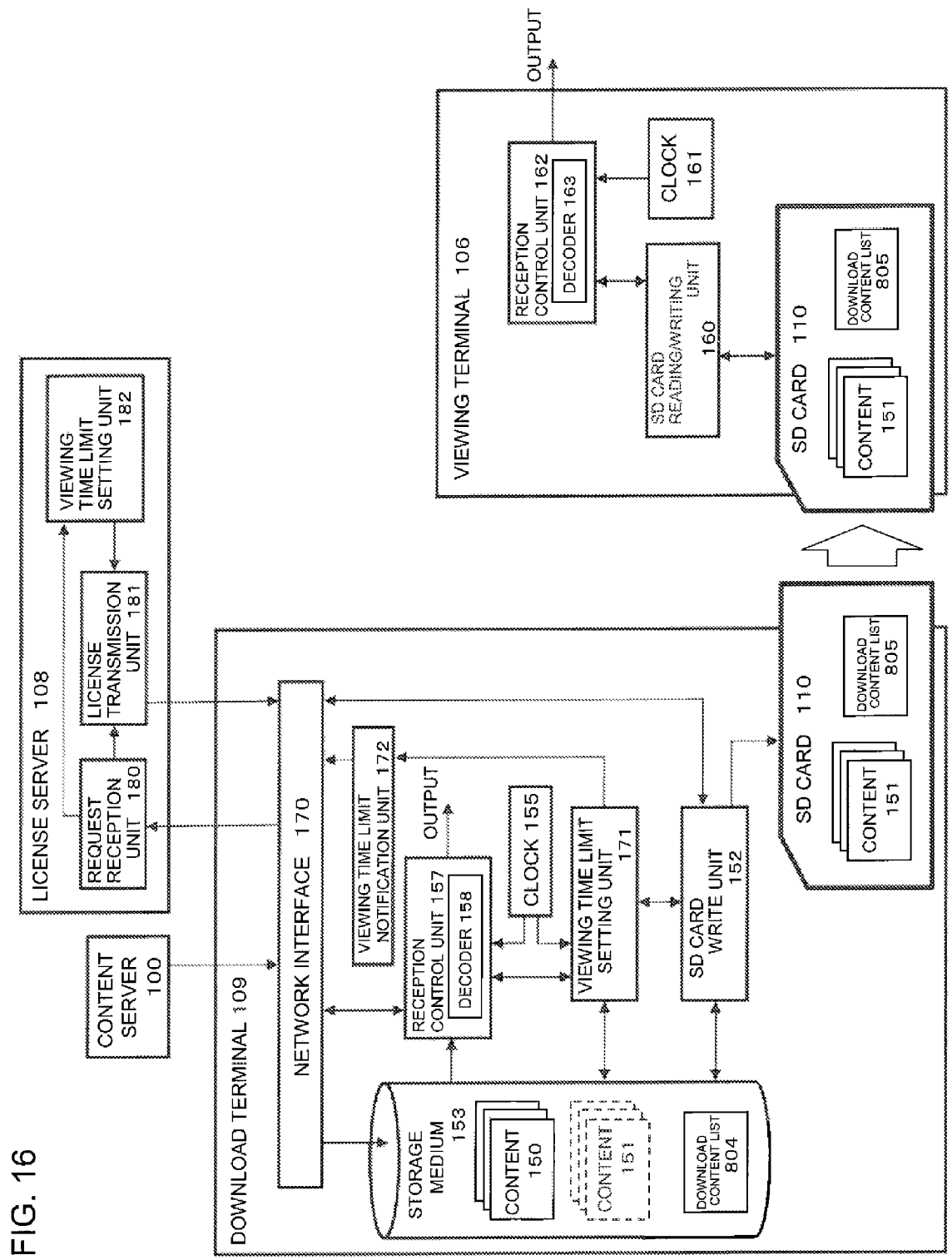
FIG. 16 is a block diagram of a content utilization system according to the third embodiment of the present invention.

FIG. 16 is a block diagram of a content utilization system according to a third embodiment of the present invention. In FIG. 16, the components that are the same as those in FIG. 8 are denoted by the same reference numerals.

A download terminal 109 in the third embodiment has a function of acquiring a viewing license to reproduce a downloaded content by itself according to the viewing license. When reproducing the downloaded content for the first time, the download terminal 109 acquires the viewing license.

In the content utilization system of the third embodiment, when the download terminal 109 writes out a content to an SD card 110, the download terminal 109 also writes out a download content list 805 as the viewing license for the content. Therefore, when the viewing of the content written out to the SD card 110 is started, the content can be viewed without acquiring the viewing license anew.

The download terminal 109 is connected to the content server 100 and a license server 108 through the Internet (not shown).

A network interface 170 in the download terminal 109, as is the case with the network interface 156 of the second embodiment, downloads an encrypted content from the content server 100 to store the encrypted content in the storage medium 153, such as an HDD, and downloads a viewing license and a writing-out license from the license server 108 to store the licenses in the storage medium 153.

The network interface 170 corresponds to an example of a content acquisition unit and a license acquisition unit according to the present invention.

The download terminal 109 of the third embodiment includes a viewing time limit notification unit 172 in addition to the components of the download terminal 105 of the second embodiment.

A processing in a viewing time limit setting unit 171 at the time of determination of an undetermined viewing time limit of the content differs from the processing in the viewing time limit setting unit 154 of the second embodiment.

When the viewing time limit setting unit 171 determines the viewing time limit, the viewing time limit notification unit 172 notifies the determined viewing time limit to the license server 108.

The viewing time limit notification unit 172 corresponds to an example of a time limit notification unit according to the present invention.

The license server 108 of the third embodiment includes a request reception unit 180 which receives a license request from the download terminal 109 and receives a notification of determination for the viewing time limit. Furthermore, the license server 108 includes a viewing time limit setting unit 182 which determines the viewing time limit of the pack content according to the notification of determination for the viewing time limit received from the download terminal 109.

In FIG. 16, the components that are the same as those in FIG. 8 have the same functions as those of the content utilization system in the second embodiment. The descriptions for these components are omitted.

FIGS. 17(A) to 17(D) are diagrams showing the viewing licenses and the writing-out licenses supplied by the license server 108 to the download terminal 109 in the third embodiment.

FIG. 17(A) shows a viewing license 828 with viewing time limit which includes information on a determined viewing time limit. FIG. 17(B) shows a viewing license 829 with viewing term which includes information on an undetermined viewing time limit. FIG. 17(C) shows a writing-out license 830 with viewing time limit which includes information on a determined viewing time limit. FIG. 17(D) shows a writing-out license 831 with viewing term which includes information on an undetermined viewing time limit.

Each of the licenses 828 to 831 in the third embodiment differs from each of the licenses 824 to 827 in the second embodiment shown in FIG. 9, respectively, in that none of the licenses 828 to 831 has a pack ID 714.

The information on the viewing term 703 and the viewing time limit 704 included in each of the licenses 828 to 831 correspond to an example of a viewing term information and a viewing time limit information according to the present invention, respectively. The information on the viewing term 703 and the viewing time limit 704 correspond to an example of a viewing time constraint information according to the present invention.

Figure 18A:
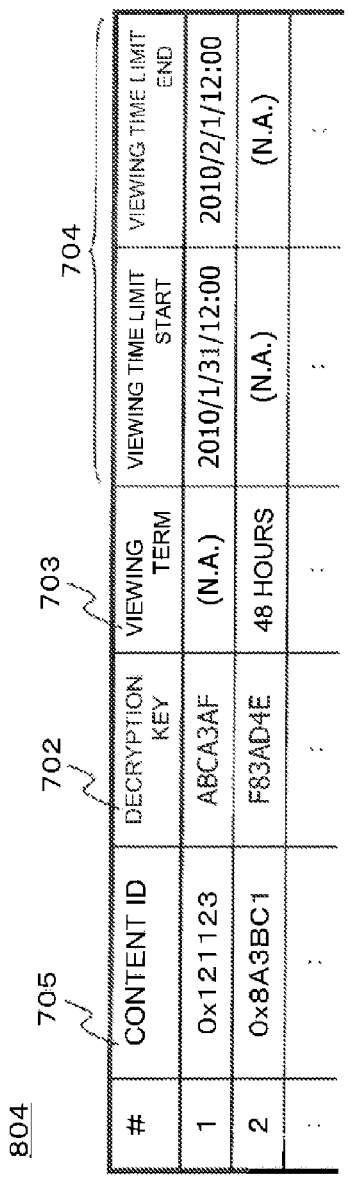
Figure 18B:
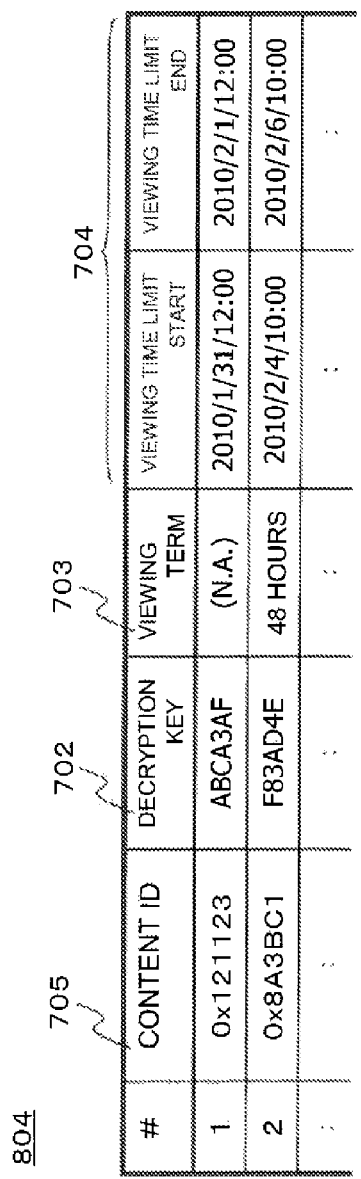

FIGS. 18(A) to 18(C) show the download content lists 804 as specific forms of the viewing licenses stored in the download terminal 109 according to the third embodiment.

When the download terminal 109 views a download content by itself, or writes out the content to the SD card 110, the information included in the viewing license acquired from the license server 108 is written in the download content list 804 content by content.

FIG. 18(A) shows details of record in the download content list 804 that was recorded when the viewing licenses for the contents with entry numbers 1 and 2 were acquired.

In FIG. 18(A), regarding the content designated by entry number 1, significant dates and times are specified in the viewing time limit 704, and the viewing time limit of the content is already determined. Regarding the content designated by entry number 2, the viewing time limit is managed, but the viewing time limit of the content is not determined yet.

FIG. 18(B) shows details of record in the download content list 804 after determination of the viewing time limit, which is carried out by the download terminal 109 when the content with entry number 2 is reproduced at the download terminal 109 or written out to the SD card 110.

FIG. 18(C) shows details of record in the download content list 804 at the time of acquisition of the viewing licenses for the contents with entry numbers 3 and 4 thereafter.

In the third embodiment, since none of the licenses 828 to 831 includes the pack ID 714, the download content list 804 also does not include the pack ID 714. In this point, the download content list 804 differs from the download content list 802 of the second embodiment shown in FIG. 10.

FIG. 19 shows the download content list 805 as a specific form of the viewing license written in the SD card 110 according to the third embodiment. As shown in FIG. 19, the configuration of the download content list 805 is similar to that of the download content list 803 of the second embodiment shown in FIG. 11.

In FIG. 16, the content 150 and the content 151 are pack contents which belong to the same content group.

Figure 20:
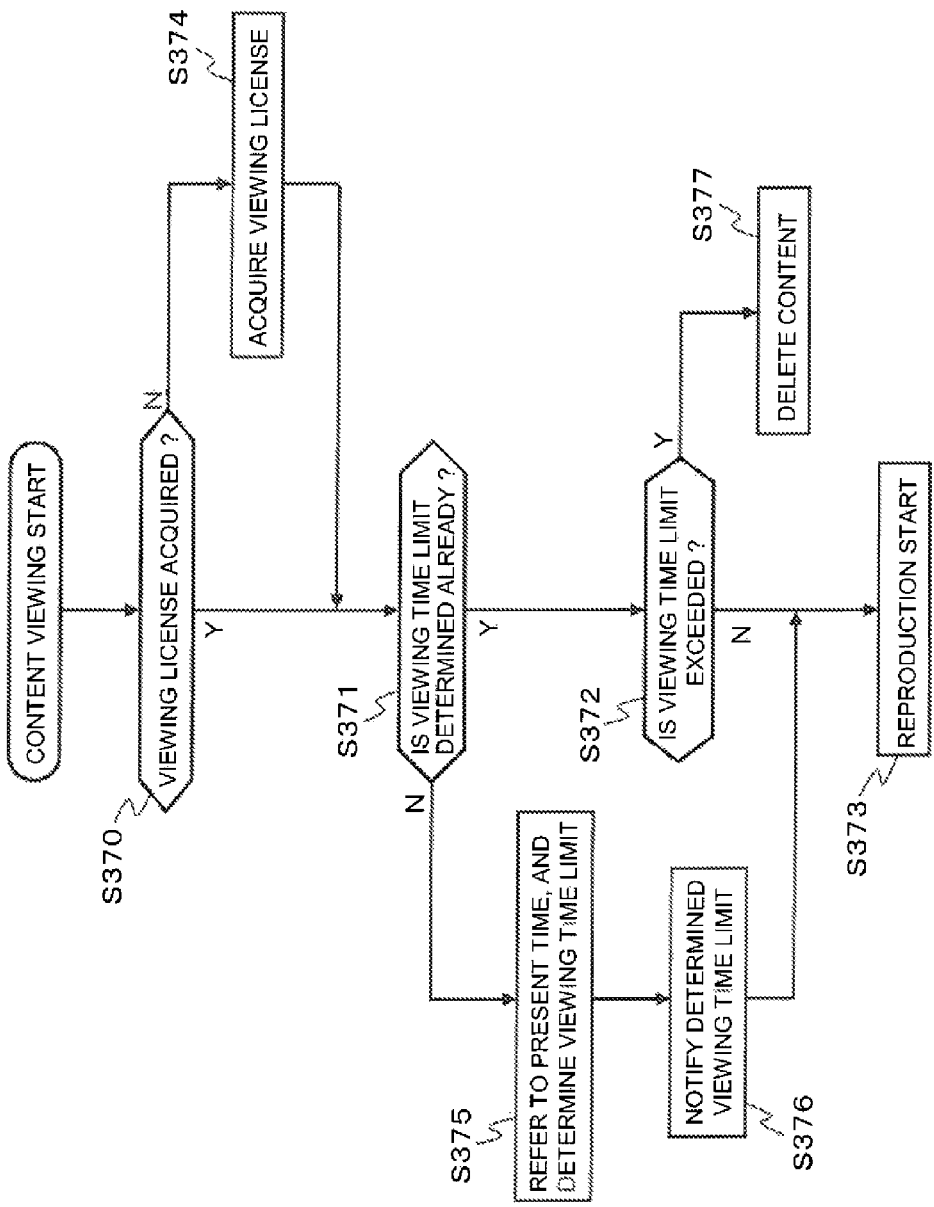
FIG. 20 is a flow chart showing a process for starting reproduction of a content stored in the download terminal according to the third embodiment of the present invention.

FIG. 20 is a flow chart of a viewing start process at the time of reproduction of the pack content 150 stored in the storage medium 153 at the download terminal 109 according to the third embodiment.

Figure 21:
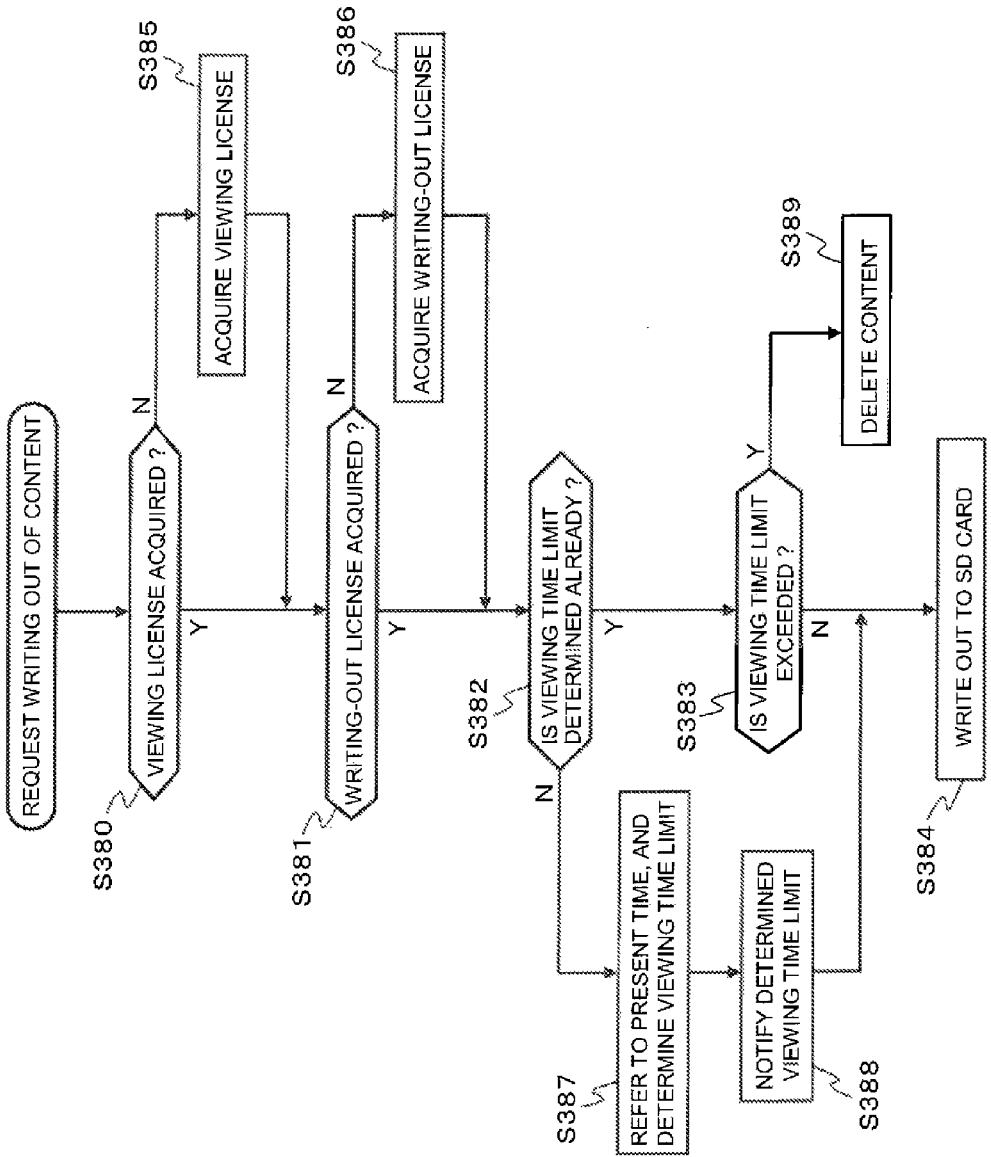
FIG. 21 is a flow chart of a process for writing out a pack content to the SD card according to the third embodiment of the present invention.

FIG. 21 is a flow chart of a writing-out process at the time of writing-out of the pack content 151, which is stored in the storage medium 153, to the SD card 110 by the download terminal 109 of the third embodiment.

Figure 22:
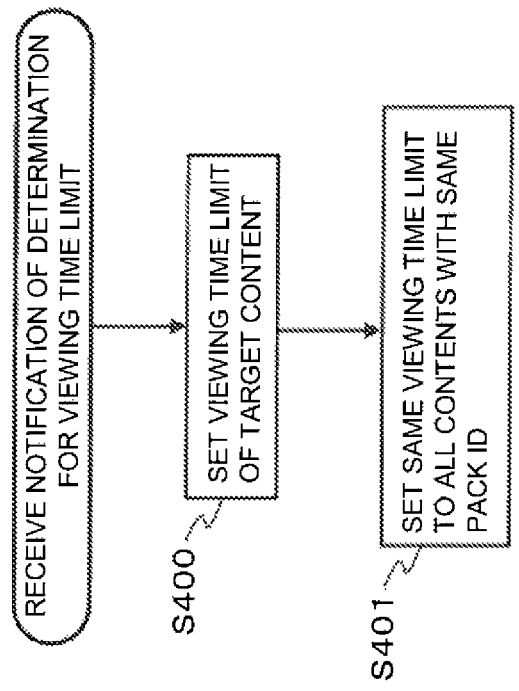
FIG. 22 is a flow chart of a viewing time limit synchronization process for pack contents in a license server according to the third embodiment of the present invention.

FIG. 22 is a flow chart of a viewing time limit synchronization process for pack contents in the license server 108 according to the third embodiment.

Operations of the content utilization system of the third embodiment for handling download contents will be described, assuming that the viewing time limit is undetermined at the beginning but is to be determined upon start of the first viewing.

Hereinafter, assuming that none of the pack contents 150 and 151 has been reproduced or written out after downloading, the following operations will be described respectively: (i) an operation to be carried out when one content 151 is written out to the SD card 110; and (ii) an operation to be carried out when the other content 150 is reproduced at the download terminal 109.

First, the operation is described, assuming that one content 151 is written out to the SD card 110 in a state where none of the pack contents 150 and 151 has been reproduced or written out.

When the SD card write unit 152 accepts an instruction for writing-out to the SD card 110 from the user, the SD card write unit 152 controls the writing-out in accordance with the flow shown in FIG. 21.

First, the SD card write unit 152 checks whether the viewing license of the target content 151 to be written out has been acquired (step S380). When the viewing license is not acquired yet, the SD card write unit 152 requests the viewing license from the license server 108 through the network interface 170, and acquires the viewing license from the license server 108 (step S385).

In this case, because the content 151 has not been reproduced or written out, the viewing license has not been acquired yet. Therefore, the SD card write unit 152 acquires the viewing license and records the information included in the acquired viewing license into the download content list 804 (step S385). For example, the information designated by entry number 2 on the download content list 804 shown in FIG. 18(A) corresponds to the information recorded according to the viewing license of the content 151 acquired at that time.

When the license server 108 receives the request for the viewing license from the download terminal 109, a license transmission unit 181 in the license server 108 transmits the viewing license to the download terminal 109 in accordance with the flow of FIG. 15, as is the case with the second embodiment.

Next, the SD card write unit 152 checks whether the writing-out license for the target content 151 to be written out has been already acquired (step S381). When the writing-out license is not acquired yet, the SD card write unit 152 requests the writing-out license from the license server 108 through the network interface 170, and acquires the writing-out license from the license server 108 (step S386).

In this case, because the content 151 has not been written out, the writing-out license has not been acquired yet. Therefore, the SD card write unit 152 acquires the writing-out license (step S386).

When the license server 108 receives the request for the writing-out license from the download terminal 109, the license transmission unit 181 transmits the writing-out license to the download terminal 109 in accordance with the flow of FIG. 7, as is the case with the first embodiment.

Next, the SD card write unit 152 causes the viewing time limit setting unit 171 to judge whether the viewing time limit of the content 151 has been determined (step S382).

In this case, because the content 151 has not been reproduced or written out, it is judged that the viewing time limit of the content 151 is not determined yet in step S382.

Next, the viewing time limit setting unit 171 performs a determining process of the viewing time limit (step S387). The viewing time limit setting unit 171 acquires the present time from the clock 155 and determines the viewing time limit 704. The viewing time limit setting unit 171 writes the calculated values of the viewing time limit start and the viewing time limit end into the download content list 804.

For example, when the content with entry number 2 shown in FIG. 18(A) is considered as the target content 151 to be written out, the viewing time limit of the content with entry number 2 is determined by the processing of step S387. Then, the download content list 804 is updated as shown in FIG. 18(B).

The viewing time limit setting unit 171 notifies, to the license server 108, the determined viewing time limit 704 of the target content 151 to be written out, by the viewing time limit notification unit 172 (step S388). The information notified from the viewing time limit notification unit 172 to the license server 108, in this case, includes information specifying the target content 151, such as the content ID 705, along with the information on the determined viewing time limit.

The SD card write unit 152 performs a writing-out process to the SD card 110 by using the writing-out license received from the license server 108 (step S384). In this case, the values of the download content list 804 are copied to the areas of the download content list 805 to be written out to the SD card 110.

For example, when the contents with entry numbers 1 and 2 shown in FIG. 18(B) are written out, the download content list 805 as shown in FIG. 19 is written out.

In step S388, when the license server 108 receives the notification of the determined viewing time limit from the download terminal 109, the license server 108 performs a viewing time limit setting process for the viewing time limit of the contents managed in the license server 108, in accordance with the flow shown in FIG. 22.

When the request reception unit 180 in the license server 180 receives the notification of the determined viewing time limit from the download terminal 109, the viewing time limit setting unit 182 sets the notified viewing time limit to a target content (the content 151 in this case) corresponding to the notification, which is described in the management information in the viewing time limit setting unit 182 (step S400).

The viewing time limit setting unit 182 refers to the management information in the viewing time limit setting unit 182 and searches for the contents which belong to the same content group of the notified content. When there is a content which belongs to the same content group, the viewing time limit setting unit 182 sets the same dates and times as those of the notified viewing time limit to the viewing time limit of the content, and determines the viewing time limits of the other contents (step S401).

In this case, the content 150 is found after search for the contents which belong to the same content group of the notified content 151. The viewing time limit of the content 150 is set using the same viewing time limit as that of the content 151. When there are contents the viewing license of which are not acquired from the download terminal 109 yet among the contents which belong to the same content group of the notified content, the viewing time limits of such contents are also set using the same viewing time limit as that of the content 151, at that time.

In the above, when the license server 108 receives the notification of the determined viewing time limit, the viewing time limits of the contents which belong to the same content group are synchronized in the license server 108.

When the content 151 written out to the SD card 110 is viewed at the viewing terminal 106, the viewing terminal 106 controls the reproduction of the content 151 on the SD card 110 in accordance with the flow shown in FIG. 14, as is the case with the second embodiment. That is, the viewing terminal 106 judges the viewing time limit of the content 151 based on the information on the viewing time limit 704 of the content 151 written in the download content list 805. When the viewing time limit is not exceeded, the viewing terminal 106 reads out the content 151 from the SD card 110, and starts the reproduction.

When the content 150 which remains in the download terminal 109 is viewed after the content 151 has been written out to the SD card 110, the reproduction control unit 157 in the download terminal 109 controls the reproduction in accordance with the flow shown in FIG. 20.

When reproduction of the content on the storage medium 153 is ordered thorough an instruction from the user (not shown), the reproduction control unit 157 in the download terminal 109 refers to the download content list 804, and checks whether the viewing license of the target content 150 has been acquired (step S370).

In this case, because the content 150 has not been reproduced in the download terminal 109, the viewing license has not been acquired yet. Therefore, the reproduction control unit 157 acquires the viewing license for the content 150 from the license server 108 by a network interface 170 (step S374).

When the license server 108 receives the request for the viewing license from the download terminal 109, the license server 108 transmits the requested viewing license to the download terminal 109 in accordance with the flow of FIG. 15, as is the case with the second embodiment.

In this case, when the content 151 was written out to the SD card 110 at the download terminal 109, the license server received the notification of the determined viewing time limit of the content 151 and, in step S401, already set the same viewing time limit to the content 150 which belongs to the same content group of the content 151. Therefore, the license server 108 manages the viewing time limit of the content 150, supposing that the viewing time limit has been determined.

Therefore, in this case, when the request reception unit 180 in the license server 108 receives the request for the viewing license of the content 150, the license transmission unit 181 judges that the viewing time limit of the content 150 has been determined (step S365), and transmits the viewing license 828 with viewing time limit to the download terminal 109 (step S366).

FIG. 18(C) shows the download content list 804 on which the reproduction control unit 157 has recorded the information regarding the content 150 according to the viewing license when acquiring the viewing license of the content 150. In FIG. 18(C), entry number 4 indicates the information on the content 150. Entry number 4 is set using the same viewing time limit 704 as that of the content 151 indicated by entry number 2, which belongs to the same content group.

Because the determined viewing time limit 704 is set in the received viewing license 828 with viewing time limit, the reproduction control unit 157 judges that the viewing time limit of the content 150 has been determined (step S371).

The reproduction control unit 157 causes the viewing time limit setting unit 171 to refer to the download content list 804 in order to compare the viewing time limit 704 of the content 150 with the present time acquired from the clock 155 (step S372). When the viewing time limit is exceeded, the viewing time limit setting unit 171 deletes the content 150 (step S377). When the viewing time limit is not exceeded, the reproduction control unit 157 starts the reproduction of the content 150 by using the viewing license acquired from the license server 108 (step S373).

As described above, even when a content which belongs to the same pack as a written-out content is reproduced after the writing-out to the SD card 110, the viewing time limits of the contents of the same pack are synchronized by the license server 108, and the viewing license is acquired which has been set using the same viewing time limit as the viewing time limit determined at the time of writing-out. Therefore, synchronization of the time limits of the contents of the same pack can be secured.

Next, the operation is described, assuming that, in a state where none of the pack contents 150 and 151 has been reproduced or written out, the other content 150 is to be reproduced at the download terminal 109.

When the reproduction control unit 157 in the download terminal 109 accepts an instruction (not shown) from the user, the reproduction control unit 157 controls the reproduction in accordance with the flow shown in FIG. 20.

When reproduction of the content 150 on the storage medium 153 is ordered, the reproduction control unit 157 refers to the download content list 804, and checks whether the viewing license of the target content 150 has been acquired (step S370).

In this case, because the content 150 has not been reproduced or written out, the viewing license has not been acquired yet. Therefore, the reproduction control unit 157 acquires the viewing license of the content 150 from the license server 108 by a network interface 170 and records the information included in the acquired viewing license into the download content list 804 (step S374).

When the license server 108 receives the request for the viewing license from the download terminal 109, the license server 108 transmits the requested viewing license to the download terminal 109 in accordance with the flow of FIG. 15, as is the case with the second embodiment.

In this case, the license server 108 has not received the notification of the viewing time limit regarding the content 150 or the notification regarding the viewing time limits of the other contents which belong to the same content group of the content 150. Therefore, the license server 108 manages the viewing time limit of the content 150, supposing that the viewing time limit has not been determined.

Therefore, in this case, when the request reception unit 180 in the license server 108 receives the request for the viewing license of the content 150, the license transmission unit 181 judges that the viewing time limit of the content 150 has not been determined (step S365), and transmits the viewing license 829 with viewing term to the download terminal 109 (step S367).

At that time, the information regarding the content 150 is recorded, by the reproduction control unit 157, according to the viewing license 829 with viewing term received from the license server 108. For example, the information regarding the content 150, such as the information regarding the content with entry number 2 of the download content list 804 shown in FIG. 18(A), is recorded.

Significant values are not specified in the viewing time limit 704 in the viewing license 829 with viewing term received from the license server 108 at that time. The reproduction control unit 157 judges that the viewing time limit of the content 150 has not been determined (step S371).

Next, the viewing time limit setting unit 171 performs the determining process of the viewing time limit (step S375). The viewing time limit setting unit 171 acquires the present time from the clock 155 and determines the viewing time limit 704. The viewing time limit setting unit 171 writes the calculated values of the viewing time limit start and the viewing time limit end into the download content list 804.

For example, when the content with entry number 2 shown in FIG. 18(A) is considered as the target content 150 to be reproduced, the viewing time limit of the content with entry number 2 is determined by the processing of step S375. Then, the download content list 804 is updated as shown in FIG. 18(B).

The viewing time limit setting unit 171 notifies, to the license server 108, the determined viewing time limit 704 of the target content 150 to be reproduced by the viewing time limit notification unit 172 (step S376), and starts the reproduction of the content by using the viewing license received from the license server 108 (step S373).

In step S376, when the license server 108 receives the notification of the determined viewing time limit from the download terminal 109, the license server 108 performs the viewing time limit setting process for the viewing time limit of the contents managed in the license server 108, in accordance with the flow shown in FIG. 22.

When the request reception unit 180 in the license server 180 receives the notification of the determined viewing time limit from the download terminal 109, the viewing time limit setting unit 182 sets the notified viewing time limit to a target content (the content 150 in this case) corresponding to the notification, which is described in the management information in the viewing time limit setting unit 182 (step S400).

The viewing time limit setting unit 182 refers to the management information in the viewing time limit setting unit 182 and searches for the contents which belong to the same content group of the notified content. When there is a content which belongs to the same content group, the viewing time limit setting unit 182 sets the same dates and times as those of the notified viewing time limit to the viewing time limit of the content, and determines the viewing time limits of the other contents (step S401).

In this case, the content 151 is found after search for the contents which belong to the same content group of the notified content 150. The viewing time limit of the content 151 is set using the same viewing time limit as that of the content 150.

In the above, when the license server 108 receives the notification of the determined viewing time limit, the viewing time limits of the contents which belong to the same content group are synchronized in the license server 108.

As described above, when the SD card write unit 152 accepts the instruction to write out the content 151, which belongs to the same pack and has not been reproduced at the download terminal 109, to the SD card 110 after the content 150 has been reproduced at the download terminal 109, the SD card write unit 152 controls the writing-out in accordance with the flow shown in FIG. 21.

First, the SD card write unit 152 checks whether the viewing license of the target content 151 to be written out has been acquired (step S380). When the viewing license is not acquired yet, the SD card write unit 152 requests the viewing license from the license server 108 through the network interface 170, and acquires the viewing license from the license server 108 (step S385).

In this case, because the content 151 has not been reproduced or written out at the download terminal 109, the viewing license has not been acquired yet. Therefore, the SD card write unit 152 acquires the viewing license of the content 151 from the license server 108 by the network interface 170 (step S385).

When the license server 108 receives the request for the viewing license from the download terminal 109, the license server 108 transmits the requested viewing license to the download terminal 109 in accordance with the flow of FIG. 15, as is the case with the second embodiment.

In this case, when the content 150 started to be reproduced at the download terminal 109, the license server received the notification of the determined viewing time limit of the content 150 and, in step S401, already set the same viewing time limit to the content 151 which belongs to the same content group of the content 150. Therefore, the license server 108 manages the viewing time limit of the content 151, supposing that the viewing time limit has been determined.

Therefore, in this case, when the request reception unit 180 in the license server 108 receives the request for the viewing license of the content 151, the license transmission unit 181 judges that the viewing time limit of the content 151 has been determined (step S365), and transmits the viewing license 828 with viewing time limit to the download terminal 109 (step S366).

FIG. 18(C) shows the download content list 804 on which the SD card write unit 152 has recorded the information regarding the content 151 according to the viewing license when acquiring the viewing license of the content 151. In FIG. 18(C), entry number 4 indicates the information on the content 151. Entry number 4 is set using the same viewing time limit 704 as that of the content 150 indicated by entry number 2, which belongs to the same content group.

Next, the SD card write unit 152 checks whether the writing-out license for the target content 151 to be written out has been already acquired (step S381). When the writing-out license is not acquired yet, the SD card write unit 152 requests the writing-out license from the license server 108 through the network interface 170, and acquires the writing-out license from the license server 108 (step S386).

In this case, because the content 151 has not been written out, the writing-out license has not been acquired yet. Therefore, the SD card write unit 152 acquires the writing-out license (step S386).

Because the determined viewing time limit 704 is set in the viewing license 828 with viewing time limit which is received from the license server 108 in step S385, the SD card write unit 152 judges that the viewing time limit of the content 151 has been determined (step S382).

The SD card write unit 152 causes the viewing time limit setting unit 171 to refer to the download content list 804 in order to compare the viewing time limit 704 of the content 151 with the present time acquired from the clock 155 (step S383). When the viewing time limit is exceeded, the viewing time limit setting unit 171 deletes the content 151 (step S389). When the viewing time limit is not exceeded, the SD card write unit 152 performs the writing-out process to the SD card 110 by using the writing-out license received from the license server 108 (step S384).

When the content 151 written out to the SD card 110 is viewed at the viewing terminal 106, the viewing terminal 106 controls the reproduction of the content 151 on the SD card 110 in accordance with the flow shown in FIG. 14, as is the case with the second embodiment.

As described above, even when a content which belongs to the same pack as a reproduced content is written out to the SD card 110 after the reproduction at the download terminal 109, the viewing time limits of the contents of the same pack are synchronized by the license server 108, and the viewing license is acquired which has been set using the same viewing time limit as the viewing time limit determined at the time of reproduction of the content. Therefore, synchronization of the time limits of the contents of the same pack can be secured.

In the third embodiment, because the information included in the viewing license is used as the information on the viewing term 703 and the viewing time limit 704, the writing-out license may not include such information. The operations of the third embodiment can be applied to a download terminal which can write out a content to an exchangeable medium such as an SD card not according to the writing-out license.

In the case of the download terminal which can write out a content to an exchangeable medium not according to the writing-out license, even if the writing-out license is not acquired from the license server 108 in the configuration of the third embodiment described above, the operations of the third embodiment can be applied to the download terminal.

Fourth Embodiment

Figure 23:
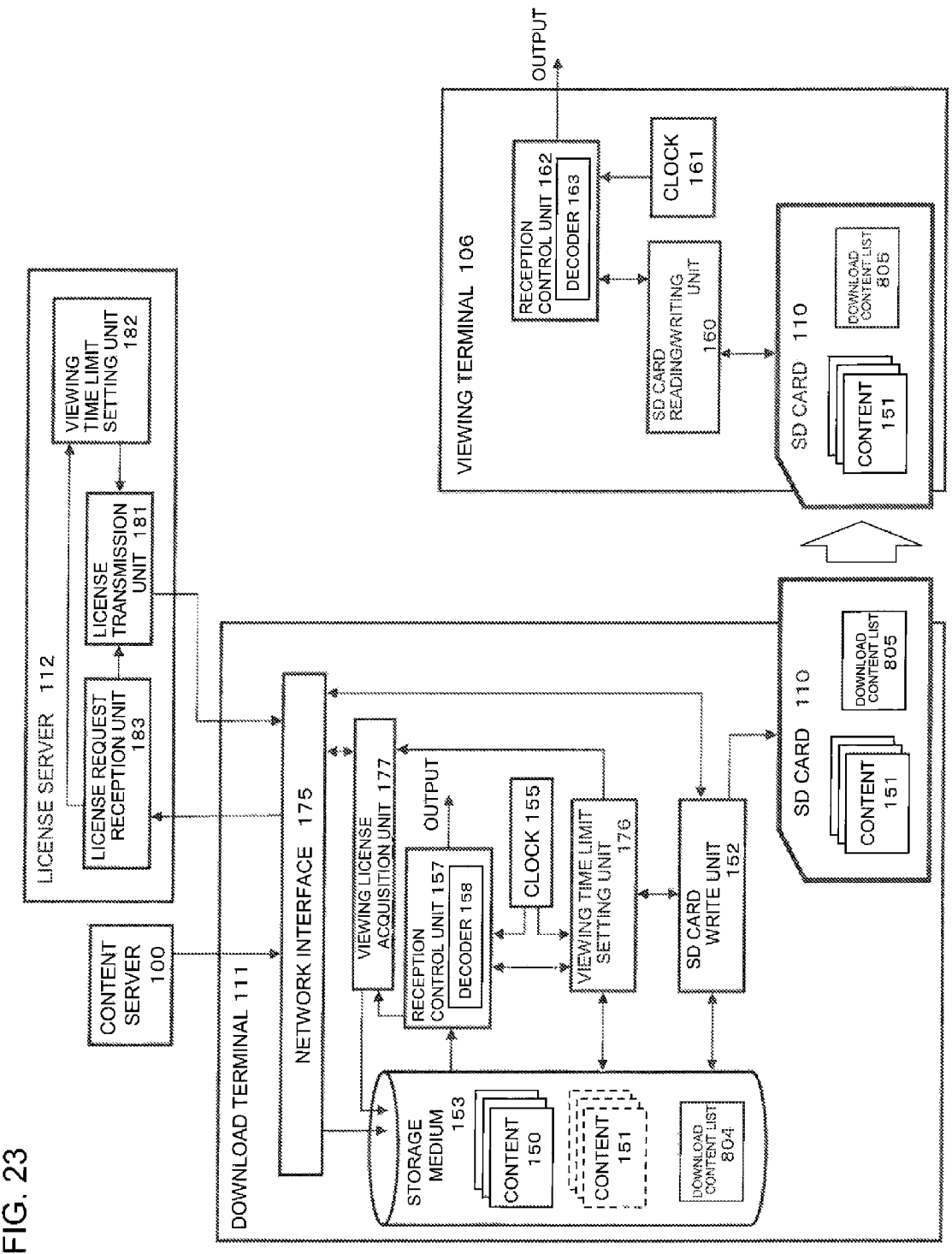
FIG. 23 is a block diagram of a content utilization system according to the fourth embodiment of the present invention.

FIG. 23 is a block diagram of a content utilization system according to a fourth embodiment of the present invention. In FIG. 23, the components that are the same as those in FIG. 16 are denoted by the same reference numerals.

In the content utilization system according to the third embodiment shown in FIG. 16, when a content is reproduced or written out at the download terminal 109, the download terminal 109 notifies the determined viewing time limit to the license server 108. In the content utilization system according to the fourth embodiment, a download terminal 111 transmits a request for a viewing license including a determination request for viewing time limit instead of notifying a determined viewing time limit as described in the third embodiment.

A viewing license acquisition unit 177 requests the viewing license including the determination request for viewing time limit from a license server 112, through a network interface 175, according to a request from the reproduction control unit 157 or from a viewing time limit setting unit 176. And the viewing license acquisition unit 177 acquires the viewing license from the license server 112.

A license request reception unit 183 in the license server 112 receives the viewing license request including the determination request for viewing time limit or, alternatively, receives a viewing license request not including the determination request for viewing time limit.

Other components in the fourth embodiment are the same as those of the content utilization system in the third embodiment shown in FIG. 16.

Figure 24:
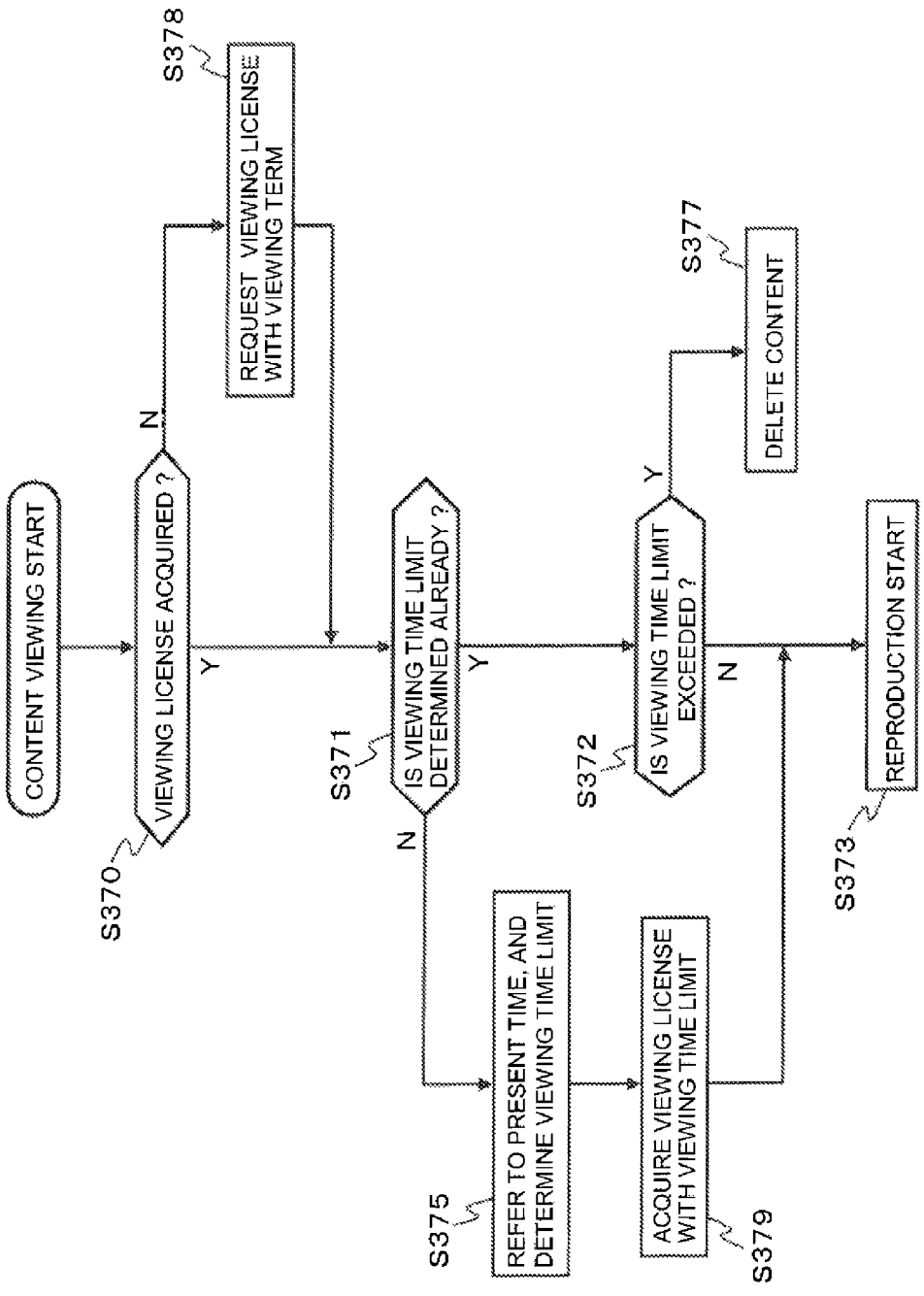
FIG. 24 is a flow chart showing a process for starting reproduction of a content stored in the download terminal according to the fourth embodiment of the present invention.

FIG. 24 is a flow chart of a viewing start process at the time of reproduction of the pack content 150 stored in the storage medium 153 at the download terminal 111 according to the fourth embodiment.

Figure 25:
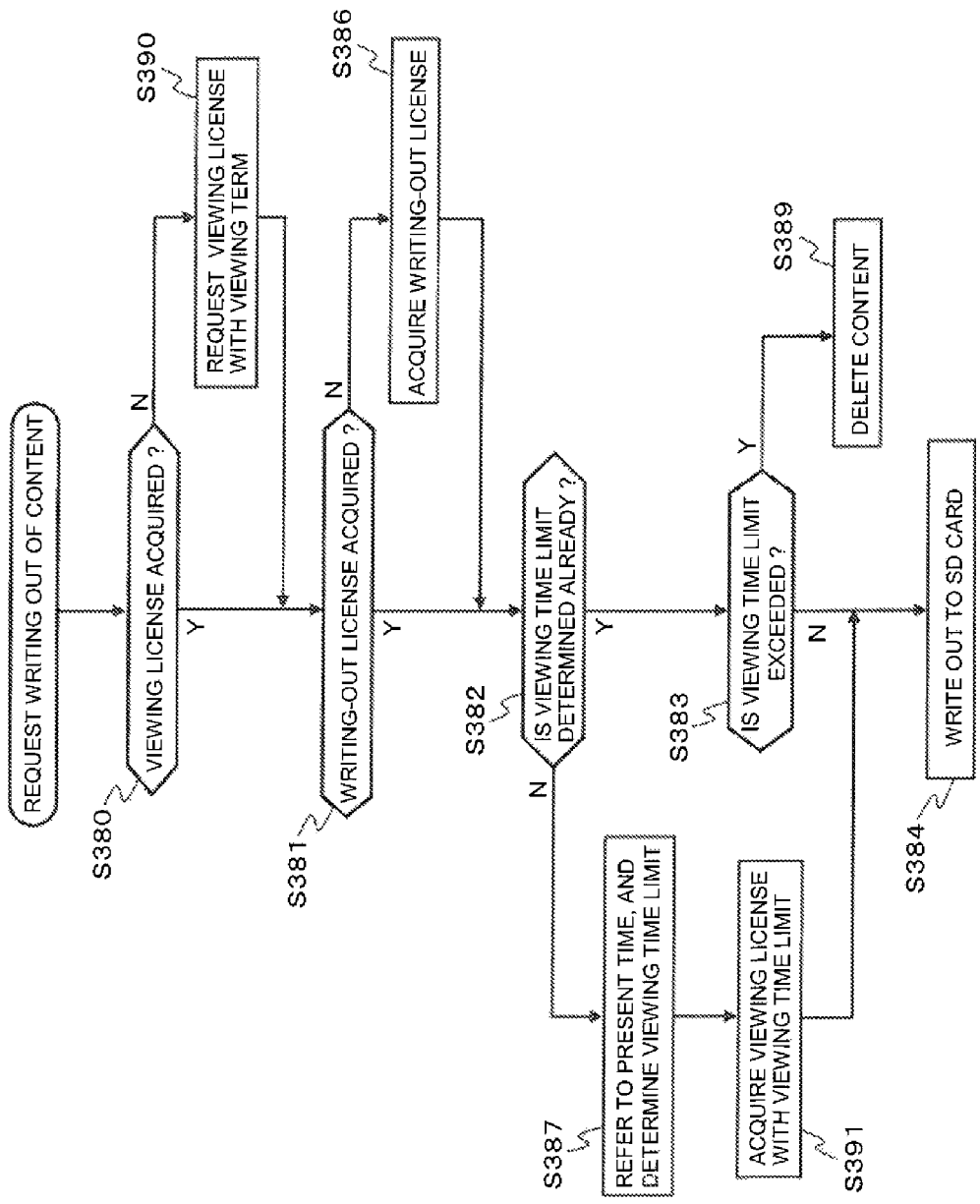
FIG. 25 is a flow chart of a process for writing out a pack content to the SD card according to the fourth embodiment of the present invention.

FIG. 25 is a flow chart of a writing-out process at the time of writing-out of the pack content 151 stored in the storage medium 153 to the SD card 110 by the download terminal 111 of the fourth embodiment.

Figure 27:
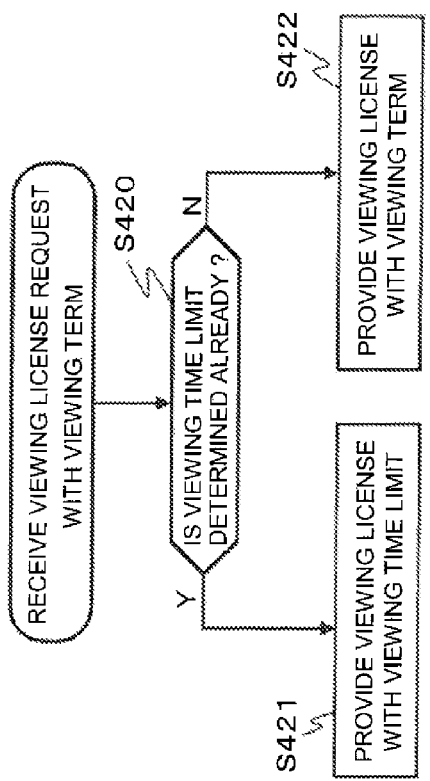
FIG. 27 is a flow chart of a viewing license providing process in the license server at the time of reception of a viewing license request with viewing term according to the fourth embodiment of the present invention.
Figure 26:
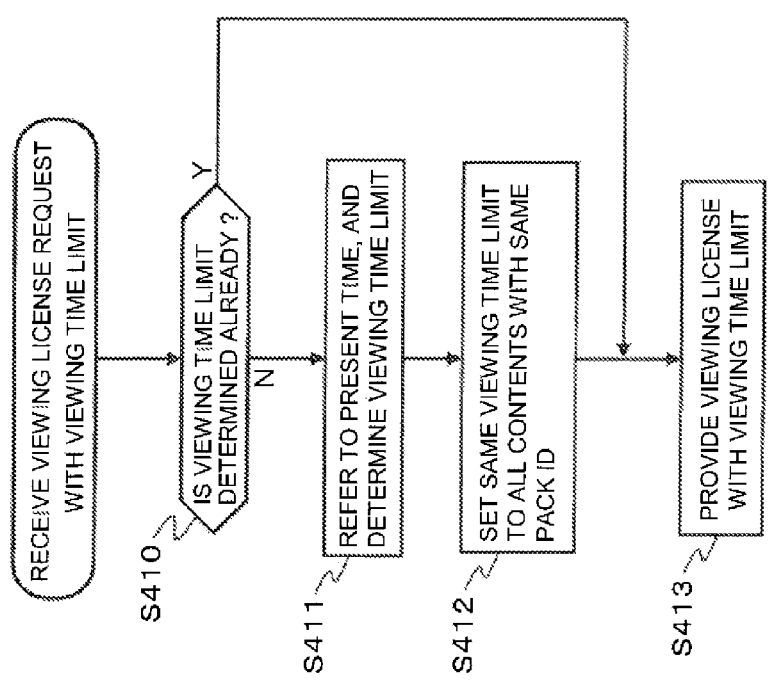
FIG. 26 is a flow chart of a viewing time limit synchronization process for pack contents in a license server at the time of reception of a viewing license request with viewing time limit according to the fourth embodiment of the present invention.
Figure 28:
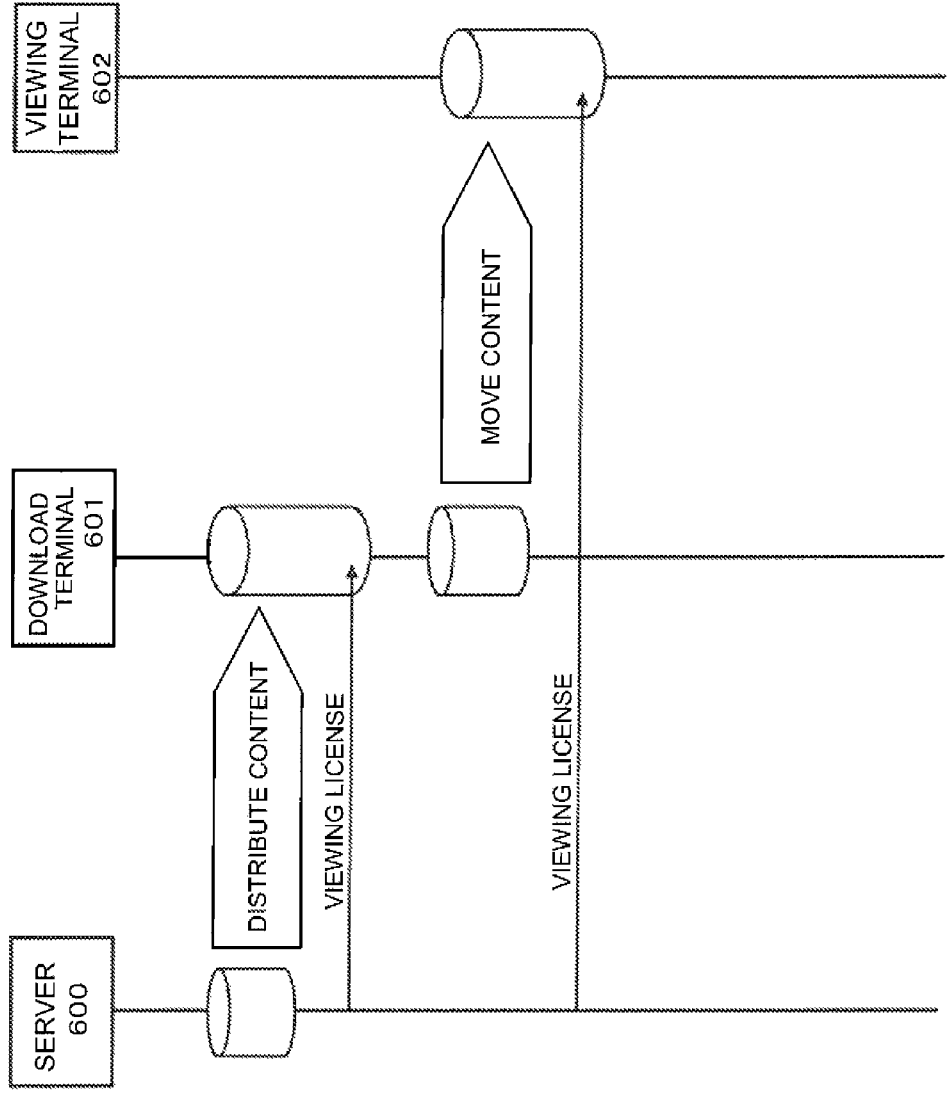
FIG. 28 is a sequence diagram showing a content download and a movement of a content between terminals in conventional content downloading.
Figure 29:
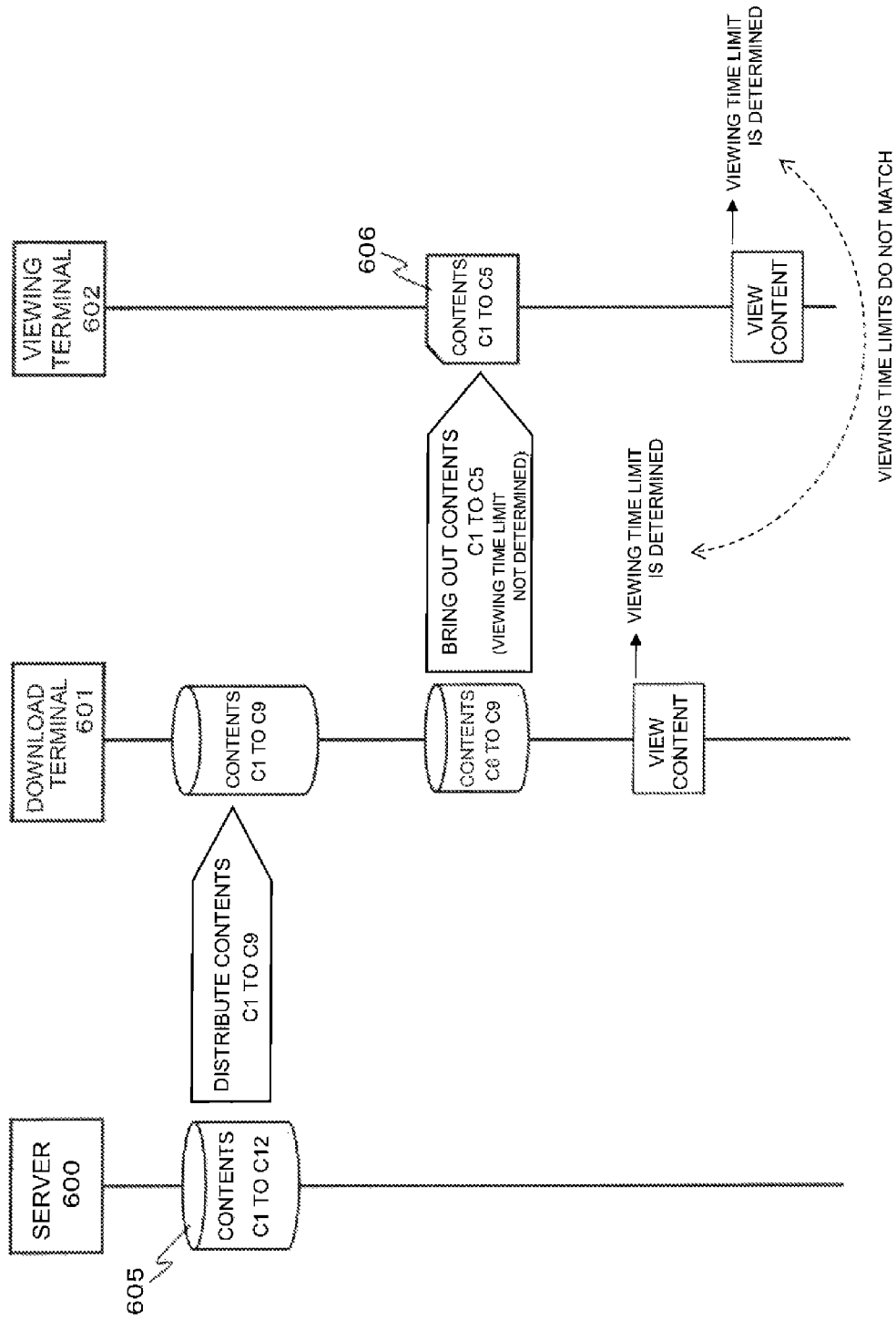
FIG. 29 is a sequence diagram showing a division view of a pack content in a conventional content downloading system.

FIG. 26 shows a processing flow at the time of reception of the viewing license request including the determination request for viewing time limit by the license server 108. FIG. 27 shows a processing flow at the time of reception of the viewing license request not including the determination request for viewing time limit by the license server 108.

The process different from the process in the content utilization system according to the third embodiment is described below.

When the content which is stored in the storage medium 153 of the download terminal is viewed, in the third embodiment, the determined viewing time limit is notified (step S376) at the time when the time limit is determined (step S375) at the download terminal 109 as shown in FIG. 20. On the other hand, the download terminal 111 in the fourth embodiment transmits the viewing license request including the determination request for viewing time limit to the license server 112, and acquires the viewing license 828 with viewing time limit, as shown in FIG. 24.

When the target content the viewing time limit of which has not been determined starts to be reproduced at the download terminal 111, the viewing time limit setting unit 176 in the download terminal 111 in the fourth embodiment determines the viewing time limit of the target content (step S375). When the viewing time limit of the target content is determined, the viewing time limit setting unit 176 causes the viewing license acquisition unit 177 to transmit, to the license server 112, the viewing license request including the determination request for viewing time limit, and acquires the viewing license 828 with viewing time limit (step S379).

When the license server 112 receives the viewing license request including the determination request for viewing time limit, the license server 112 performs a determining process of the viewing time limit in accordance with the flow shown in FIG. 26, and sends the viewing license 828 with viewing time limit back to the download terminal 111.

When the license request reception unit 183 in the license server 112 receives the viewing license request including the determination request for viewing time limit from the download terminal 111, the viewing time limit setting unit 182 refers to the management information in the viewing time limit setting unit 182, and judges whether the viewing time limit of the requested content has been determined or not (step S410).

When, in step S410, it is judged that the viewing time limit of the requested content is already determined, the license transmission unit 181 transmits the viewing license 828 with viewing time limit, which has been already set, to the download terminal 111 (step S413).

When, in step S410, it is judged that the viewing time limit of the requested content has not been determined yet, the viewing time limit setting unit 182 determines the viewing time limit for the requested content based on the present time and records the determined time limit into the management information in the viewing time limit setting unit 182 (step S411).

The viewing time limit setting unit 182 refers to the management information in the viewing time limit setting unit 182 and searches for the contents which belong to the same content group of the content, the viewing time limit of which has been just determined. When there is a content which belongs to the same content group, the viewing time limit setting unit 182 sets the same dates and times as those of the determined viewing time limit of the requested content to the viewing time limit of the content, and determines the viewing time limit of the content (step S412).

The license transmission unit 181 transmits, to the download terminal 111, the viewing license 828 with viewing time limit, that is to say, the viewing time limit 704 determined by the viewing time limit setting unit 182 (step S413).

When the download terminal 111 accepts an instruction to reproduce a content from the user, the viewing time limit of the target content to be reproduced is determined (step S375) and the viewing license request including the determination request for viewing time limit is transmitted to the license server 112 (step S379). Therefore, the viewing time limit of the target content in the license server 112 is also determined (step S411), and the viewing time limits of the contents which belong to the same content group of the target content are synchronized (step S412).

As described above, when the viewing time limit is determined at the start of reproduction of the content in the download terminal 111, the viewing license request including the determination request for viewing time limit for the content is transmitted to the license server 112. Therefore, it is possible to obtain the same effect as that in the case where the download terminal 109 notifies the determined viewing time limit to the license server 108 in the third embodiment (step S376).

The processing of the request for the license with viewing time limit at step S378 in FIG. 24 is the same as the processing of step S374 in the third embodiment shown in FIG. 20. The processing (a flow shown in FIG. 27) of the license server 112 which receives the request for the license with viewing term, that is, the request for the license not including the determination request for viewing time limit, is the same as the processing (a flow shown in FIG. 15) of the license server 108 which receives the viewing license in the third embodiment.

Therefore, also in the fourth embodiment, as described in the third embodiment, even when a content which belongs to the same pack as a reproduced content is written out to the SD card 110 after the reproduction at the download terminal 111, the viewing time limits of the contents of the same pack are synchronized by the license server 112, and the viewing license is acquired which has been set using the same viewing time limit as the viewing time limit determined at the time of reproduction of the content. Therefore, synchronization of the time limits of the contents of the same pack can be secured.

Next, a processing of writing out a content, which is stored in the storage medium 153 of the download terminal, to the SD card 110 is described.

When a content which is stored in the storage medium 153 of the download terminal is written out to the SD card 110, in the third embodiment as shown in FIG. 21, the determined viewing time limit is notified (step S388) at the time of determination (step S387) of the viewing time limit of the content to be written out at the download terminal 109. When the content which is stored in the storage medium 153 of the download terminal is written out to the SD card 110, as shown in FIG. 25, the download terminal 111 in the fourth embodiment transmits the viewing license request including the determination request for viewing time limit to the license server 112, and acquires the viewing license 828 with viewing time limit.

That is, when the viewing time limit of the target content to be written out is not determined, the viewing time limit setting unit 176 in the download terminal 111 in the fourth embodiment determines the viewing time limit of the target content at the time of writing-out (step S387). When the viewing time limit setting unit 176 determines the viewing time limit of the target content (step S387), the viewing time limit setting unit 176 causes the viewing license acquisition unit 177 to transmit the viewing license request including the determination request for viewing time limit to the license server 112, and acquires the viewing license 828 with viewing time limit (step S391).

In this case, when the license server 112 receives the viewing license request including the determination request for viewing time limit, the license server 112 performs the providing process of the viewing license in accordance with the flow of FIG. 26.

When the download terminal 111 accepts an instruction to write out a content from the user, the viewing time limit of the target content to be written out is determined (step S387) and the viewing license request including the determination request for viewing time limit is transmitted to the license server 112 (step S391). Therefore, the viewing time limit of the target content in the license server 112 is also determined (step S411), and the viewing time limits of the contents which belong to the same content group of the target content are synchronized (step S412).

As described above, in the case of writing out a content to the SD card 110, when the viewing time limit is determined at the download terminal 111, the viewing license request including the determination request for viewing time limit for the content is transmitted to the license server 112. Therefore, it is possible to obtain the same effect as that in the case where the download terminal 109 notifies the determined viewing time limit to the license server 108 in the third embodiment (step S388).

Therefore, also in the fourth embodiment, as described in the third embodiment, even when a content which belongs to the same pack as a written-out content is reproduced after the writing-out to the SD card 110, the viewing time limits of the contents of the same pack are synchronized by the license server 112, and the viewing license is acquired which has been set using the same viewing time limit as the viewing time limit determined at the time of writing-out of the content. Therefore, synchronization of the time limits of the contents of the same pack can be secured.

In the fourth embodiment, because the information included in the viewing license is used as the information on the viewing term 703 and the viewing time limit 704, the writing-out license may not include such information. The operations of the fourth embodiment can be applied to a download terminal which can write out a content to an exchangeable medium such as an SD card not according to the writing-out license.

In the case of the download terminal which can write out a content to an exchangeable medium not according to the writing-out license, even if the writing-out license is not acquired from the license server 112 in the configuration of the fourth embodiment described above, the operations of the fourth embodiment can be applied to the download terminal.

The viewing license acquisition unit 177, which transmits a request for the viewing license including the determination request for viewing time limit instead of notifying the viewing time limit in step S379 and step S391, corresponds to an example of a time limit notification unit according to the present invention.

Synchronization of the time limits of decentralized pack contents is described in the second to fourth embodiments. However, even if a content is not a content of pack contents, for example, when a content in a state in which the content can be viewed is left in the download terminal and is further copied to the SD card, the viewing time limit of the content in the download terminal can be synchronized, by the same method, with the viewing time limit of the copied content on the SD card.

Each of the license servers 101, 108 and 112 corresponds to an example of a writing-out license server which transmits a writing-out license according to the present invention. Each of the license servers 101, 108 and 112 also corresponds to an example of a viewing license server which transmits a viewing license according to the present invention. In the above descriptions of each embodiment, each of the license servers 101, 108 and 112 serves both as the writing-out license server and the viewing license server according to the present invention. The writing-out license server and the viewing license server can be prepared separately. When the writing-out license server and the viewing license server are prepared separately, the system is operated by synchronizing, between the writing-out license server and the viewing license server, the information indicating use conditions such as the viewing term 703 or the viewing time limit 704. At least one of the writing-out license server and the viewing license server may have a function in the request reception unit 180 of receiving the notification of determination for the viewing time limit. Both of the writing-out license server and the viewing license server may have such function.

In the above descriptions of each embodiment, the content server 100 and the license servers 101, 108 and 112 are prepared separately. One server which has the function of the content server 100 and the functions of the license servers 101, 108 and 112 can be prepared in place of the content server 100 and the license servers 101, 108 and 112.

In the above descriptions of each of the second to fourth embodiments, the SD card write unit copies the license regarding the content to the SD card. Instead of being copied, the license can be changed into a parameter format of another copyright protection system to be written out. The content can be used flexibly by using a copyright protection system which is supported by the viewing terminal 106.

In each of the embodiments, the viewing license and the writing-out license shown in FIGS. 2, 9 and 17 are merely examples. A detailed description, a configuration and the like of the license are not limited to these.

As described above, the configuration of the present invention may be realized in terms of software or may be realized in terms of hardware.

The download terminal and the content utilization system according to the present invention have an effect of synchronizing viewing time limits of a plurality of contents that need to have the same viewing time limits even if some of the contents, the viewing time limits of which are not determined yet, among the plurality of contents are written out to an exchangeable medium before the viewing time limits are determined, and are useful as a download terminal, a content utilization system and the like for copying and bringing out an encrypted content with managed viewing time limit to an exchangeable medium.

What is claimed is:

1. A download terminal which (i) acquires and stores a content from a content server, (ii) acquires, from a writing-out license server, a writing-out license including (a) a pack identifier of the content, the pack identifier of the content being given to a content group to which the content belongs and (b) viewing term information of the content as a use condition for writing out of the content to an exchangeable medium, and (iii) writes out the content to the exchangeable medium according to the writing-out license, the download terminal comprising:
    a non-transitory storage that stores the content;
    a time limit determination unit that determines, based on the viewing term information of the content, a viewing time limit of the content, the viewing time limit of the content having not been determined;
    a time limit notification unit which notifies the determination of the viewing time limit of the content to the writing-out license server when the time limit determination unit determines the viewing time limit of the content; and
    a pack time limit determination unit that sets the determined viewing time limit of the content as a viewing time limit of other content, from among stored contents, having a same pack identifier as the pack identifier of the content,
    wherein the time limit notification unit transmits a request for a viewing license including a determination request of the viewing time limit of the content to a viewing license server, without notifying of the determination of the viewing time limit of the content to the viewing license server by the time limit notification unit, the viewing license server transmitting a viewing license including viewing time constraint information for the content according to the request for the viewing license.

2. The download terminal according to claim 1, wherein when the content is written out to the exchangeable medium, the time limit determination unit determines the viewing time limit of the content.

3. The download terminal according to claim 1, wherein when the writing-out license is acquired from the writing-out license server and if a viewing time limit of a content having a same pack identifier as the pack identifier of the content, has been determined, the time limit determination unit sets the determined viewing time limit to the viewing time limit of the content.

4. The download terminal according to claim 1, further comprising
    a content writing-out unit which writes out the content and information of the determined viewing time limit of the content to the exchangeable medium.

5. A content utilization system comprising the download terminal according to claim 1 and a writing-out license server, wherein
    when the writing-out license server receives a request for the writing-out license from the download terminal, the writing-out license server transmits the writing-out license to the download terminal, the writing-out license including the pack identifier of the content and the viewing term information of the content.

6. A download terminal which (i) acquires and stores a content from a content server, (ii) acquires, from a writing-out license server, a writing-out license including a use condition for writing out of the content to an exchangeable medium, (iii) acquires, from a viewing license server, a viewing license including a use condition for reproducing of the content, at least one of the writing-out license and the viewing license including (a) a pack identifier of the content, the pack identifier of the content being given to a content group to which the content belongs and (b) viewing term information of the content as the use condition for writing out of the content to an exchangeable medium or the use condition for reproducing of the content, and (iv) writes out the content to the exchangeable medium according to the writing-out license, the download terminal comprising:
- a non-transitory storage that stores the content;
- a time limit determination unit that determines, based on the viewing term information of the content, a viewing time limit of the content, the viewing time limit of the content having not been determined;
- a time limit notification unit which notifies the determination of the viewing time limit of the content to at least one of the viewing license server and the writing-out license server when the time limit determination unit determines the viewing time limit of the content; and
- a pack time limit determination unit that sets the determined viewing time limit of the content as a viewing time limit of other content, from among stored contents, having a same pack identifier as the pack identifier of the content.

7. The download terminal according to claim 6, wherein when the content is written out to the exchangeable medium, the time limit determination unit determines the viewing time limit of the content.

8. The download terminal according to claim 6, wherein when the writing-out license is acquired from the writing-out license server, when the writing-out license includes the pack identifier of the content, and if a viewing time limit of a content having a same pack identifier as the pack identifier of the content has been determined, the time limit determination unit sets the determined viewing time limit to the viewing time limit of the content.

9. The download terminal according to claim 6, further comprising
- a content writing-out unit which writes out the content and information of the determined viewing time limit of the content to the exchangeable medium.

10. A content utilization system comprising the download terminal according to claim 6 and a writing-out license server, wherein
when the writing-out license server receives a request for the writing-out license from the download terminal, the writing-out license server transmits the writing-out license to the download terminal, the writing-out license including the pack identifier of the content and the viewing term information of the content.

11. A download terminal which (i) acquires and stores a content from a content server, (ii) acquires, from a viewing license server, a viewing license including (a) a pack identifier of the content, the pack identifier of the content being given to a content group to which the content belongs and (b) viewing term information of the content as a use condition for reproducing of the content, and (iii) writes out the content to an exchangeable medium, the download terminal comprising:
- a non-transitory storage that stores the content;
- a time limit determination unit that determines, based on the viewing term information of the content, a viewing time limit of the content, the viewing time limit of the content having not been determined;
- a time limit notification unit which notifies the determination of the viewing time limit of the content to the viewing license server when the time limit determination unit determines the viewing time limit of the content; and
- a pack time limit determination unit that sets the determined viewing time limit of the content as a viewing time limit of other content, from among stored contents, having a same pack identifier as that the pack identifier of the content, wherein the time limit notification unit transmits a request for the viewing license including a determination request of the viewing time limit of the content to the viewing license server, without notifying of the determination of the viewing time limit of the content to the viewing license server by the time limit notification unit, the viewing license server transmitting the viewing license including the viewing term information of the content according to the request for the viewing license.

12. The download terminal according to claim 11, wherein when the content is written out to the exchangeable medium, the time limit determination unit determines the viewing time limit of the content.

13. The download terminal according to claim 11, further comprising
a content writing-out unit which writes out the content and information of the determined viewing time limit of the content to the exchangeable medium.

14. A content utilization system comprising:
a license server that (i) transmits a viewing license including a viewing time constraint information for a content according to a request for the viewing license to view the content, (ii) transmits a writing-out license including the viewing time constraint information, according to a request for the writing-out license to write out the content to an exchangeable medium, and (iii) receives a notification of a determination of a viewing time limit of the content; and
a download terminal including
- a content acquisition unit which acquires the content from a content server,
- a license acquisition unit which acquires the viewing license and the writing-out license from the license server,
- a time limit determination unit which determines the viewing time limit of the content based on the viewing time constraint information when the content is written out to the exchangeable medium and if the viewing time limit of the content has not been determined,
- a time limit notification unit which notifies the determination of the viewing time limit of the content to the license server when the time limit determination unit determines the viewing time limit of the content, and
- a content writing-out unit which writes out the content and the determined viewing time limit of the content to the exchangeable medium according to the writing-out license,
wherein the license server sets viewing time limit information as the viewing time constraint information of the content when the viewing time limit of the content has been determined, and the license server sets viewing term information as the viewing time constraint information of the content when the viewing time limit of the content has not been determined,
wherein when the license server receives the notification of the determination of the viewing time limit of the content from the download terminal and if there is other content which belongs to a same content group as a content group of the content and which has not been acquired by the download terminal, the license server sets the notified and determined viewing time limit of the content as a viewing time limit of the other content which has not been acquired by the download terminal, and wherein the license server includes:
a viewing license server which transmits the viewing license; and
a writing-out license server which transmits the writing-out license, and
wherein when the time limit determination unit determines the viewing time limit of the content, the time limit notification unit in the download terminal transmits the determination of the viewing time limit of the content to at least one of the viewing license server and the writing-out license server.

15. The content utilization system according to claim 14, wherein
one server serves as the content server and the license server.

16. The content utilization system according to claim 14, wherein
the time limit notification unit in the download terminal transmits the request for the viewing license including a determination request of the viewing time limit of the content to the license server, without notifying of the determination of the viewing time limit of the content to the license server by the time limit notification unit.

17. A content utilization system comprising:
a license server that (i) transmits a viewing license including a viewing time constraint information for a content according to a request for the viewing license to view the content, and (ii) receives a notification of a determination of a viewing time limit of the content;
a download terminal including
a content acquisition unit which acquires the content from a content server,
a license acquisition unit which acquires the viewing license from the license server,
a time limit determination unit which determines the viewing time limit of the content based on the viewing time constraint information when the content is written out to an exchangeable medium and if the viewing time limit of the content has not been determined,
a time limit notification unit which notifies the determination of the viewing time limit of the content to the license server when the time limit determination unit determines the viewing time limit of the content, and
a content writing-out unit which writes out the content and the determined viewing time limit of the content to the exchangeable medium,
wherein the license server sets viewing time limit information as the viewing time constraint information of the content when the viewing time limit of the content has been determined, and the license server sets viewing term information as the viewing time constraint information of the content when the viewing time limit of the content has not been determined,
wherein when the license server receives the notification of the determination for the viewing time limit of the content from the download terminal and if there is other content which belongs to a same content group as a content group of the content and which has not been acquired by the download terminal, the license server sets the notified and determined viewing time limit of the content as a viewing time limit of the other content which has not been acquired by the download terminal, and
wherein the time limit notification unit in the download terminal transmits the request for the viewing license including a determination request of the viewing time limit of the content to the license server, without notifying of the determination of the viewing time limit of the content to the license server by the time limit notification unit.

18. The content utilization system according to claim 17, wherein one server serves as the content server and the license server.

* * * * *